(12) United States Patent
Everett et al.

(10) Patent No.: US 10,554,523 B2
(45) Date of Patent: *Feb. 4, 2020

(54) SYSTEM AND METHODS FOR DETERMINING CHANNEL CHARACTERISTICS

(71) Applicant: The Boeing Company, Chicago, IL (US)

(72) Inventors: Matthew M. Everett, Torrance, CA (US); Tuan Q. Ha, Irvine, CA (US); Christopher W. Reeves, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,476

(22) Filed: Jul. 11, 2018

(65) Prior Publication Data
US 2018/0331926 A1 Nov. 15, 2018

Related U.S. Application Data

(63) Continuation of application No. 15/161,975, filed on May 23, 2016, now Pat. No. 10,050,860.

(51) Int. Cl.
*H04L 12/26* (2006.01)
*H04L 1/00* (2006.01)

(52) U.S. Cl.
CPC ........ *H04L 43/0847* (2013.01); *H04L 1/0071* (2013.01); *H04L 1/0073* (2013.01); *H04L 43/0829* (2013.01)

(58) Field of Classification Search
None
See application file for complete search history.

(56) References Cited

U.S. PATENT DOCUMENTS 7,085,561 B1 8/2006 Kwolek et al.
2003/0063587 A1 4/2003 Cho et al.
(Continued)

OTHER PUBLICATIONS

Mousa, et al. "Channels Estimation in OFDM System Over Rician Fading Channel Based on Comb-Type Pilots Arangement"; Institution of Engineering and Technology 2010; IET Signal Processing; vol. 4, Issue 5, pp. 598-602; doi: 10.1049/iet-spr.2009.0170.
(Continued)

*Primary Examiner* — Otis L Thompson, Jr.
(74) *Attorney, Agent, or Firm* — Perman & Green, LLP

(57) ABSTRACT

A system for determining communication channel characteristics includes a transmitter comprising a bit sequence generator and a frame processing and modulator unit, where the frame processing and modulator unit is configured to generate a transmission frame comprising an embedded bit sequence generated by the bit sequence generator and at least one embedded side channel field, the transmitter further configured to transmit the transmission frame over a communications channel, a receiver in communication with the transmitter over the communications channel and configured to receive the transmission frame, and a data processor, in communication with the receiver through a data processor interface, configured to receive the transmission frame from the receiver, the processor further configured to process the transmission frame to detect and analyze distortions in a waveform corresponding to the transmission frame generated during the transmission over the communications channel based on the embedded bit sequence and the at least one embedded side channel field.

19 Claims, 16 Drawing Sheets

(56) References Cited

U.S. PATENT DOCUMENTS

| | | | |
|---|---|---|---|
| 2004/0114560 A1 | 6/2004 | Jacobsen | |
| 2015/0049745 A1* | 2/2015 | Han | H04L 1/00 |
| | | | 370/337 |
| 2016/0029232 A1 | 1/2016 | Ji et al. | |
| 2016/0205569 A1* | 7/2016 | Han | H04L 25/03012 |
| | | | 370/252 |
| 2017/0033833 A1* | 2/2017 | Terry | H04B 7/0413 |
| 2017/0187587 A1 | 6/2017 | Keppel et al. | |

OTHER PUBLICATIONS

Frenzel, Louis. "Understanding Modern Digital Modulation Techniques"; Electronic Design, 2012; http://electronicdesign.com/communications/understandingmoderndigitalmodulationtechniques.

Hsieh, et al "Channel Estimation for OFDM Systems Based on Comb-type Pilot Arrangement in Frequency Selective Fading Channels"; 1998 IEEE; IEEE Transactions on Consumer Electronics, vol. 44, No. 1, Feb. 1998.

Gallagher, Robert, Course Materials for 6.450 Priniciples of Digital Communications I, Fall 2006; MIT OpenCourseWare (http://ocw.mit.edu/), Massachusetts Institute of Technology. Downloaded on May 23, 2016.

Coleri, et al. "Channel Estimation Techniques Based on Pilot Arrangement in OFDM Systems"; IEEE Transactions on Broadcasting, vol. 48, No. 3, Sep. 2002.

"Channel Estimation"; http://www.mathworks.com/help/lte/ug/channel-estimation.html; Downloaded Mar. 24, 2016.

Li, et al. "Robust Channel Estimation for OFDM Systems with Rapid Dispersive Fading Channels"; IEEE Transactions on Communications, vol. 46, No. 7, pp. 902-915, Jul. 1998.

European Extended Search Report, European Application No. 17167046.6, dated Sep. 6, 2017.

* cited by examiner

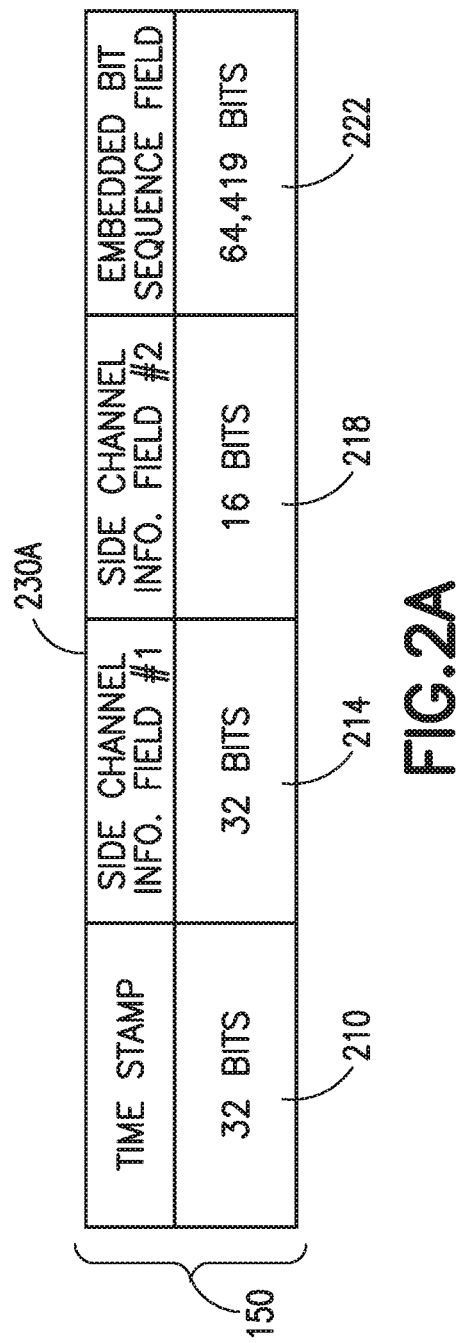

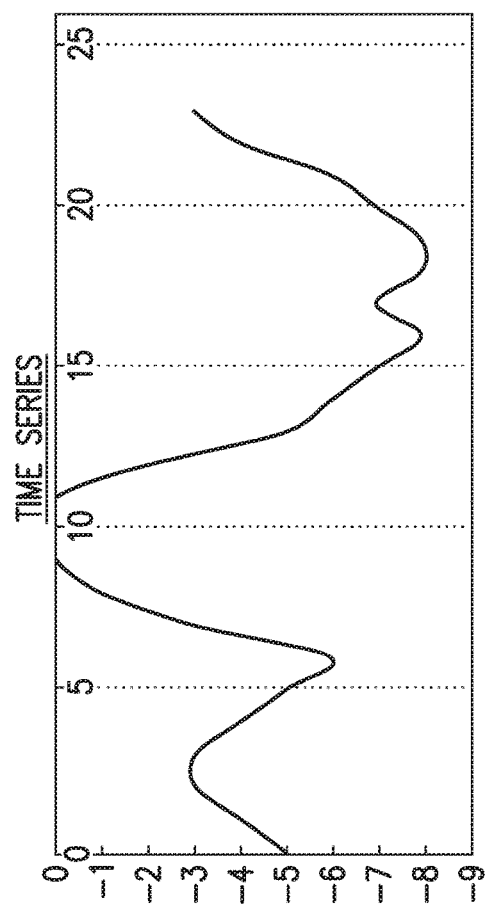
FIG. 5A
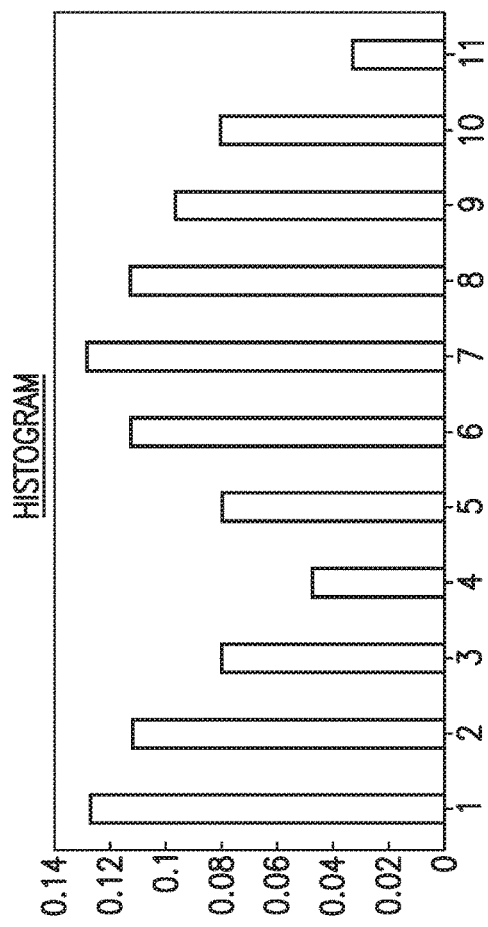
FIG. 5B
FIG. 5C

SYSTEM AND METHODS FOR DETERMINING CHANNEL CHARACTERISTICS

CROSS-REFERENCE TO RELATED APPLICATIONS

This application is a continuation of and claims the benefit of U.S. Non-Provisional patent application Ser. No. 15/161,975 filed on May 23, 2016, the disclosure of which is incorporated by reference herein in its entirety.

FIELD

The aspects of exemplary embodiment generally relate to determining channel characteristics, more particularly, to determining channel characteristics of a channel of interest based on detected distortions within a waveform corresponding to a transmission frame.

BACKGROUND

Within the telecommunications industry, data distortions that may occur during transmission of data through various communications channels are a constant source of concern. These data distortions may include, for example, data frame losses, bit errors that occur during transmission, interference from other communication channels or nearby sources of interference, errors introduced by local weather phenomenon or atmospheric distortion and attenuation, antenna misalignment and other errors that may result during transmission. Data distortions during transmission may result in lost or erroneously communicated data. These data distortions limit the effectiveness of data communications, resulting in lower data throughput as transmitted data is lost. There is significant interest in determining channel characteristics for systems where the waveform does not support the use of conventional testing systems such as standard bit rate error testers or packet testers. These waveforms are typically layer one frame-based, comprising a series of fixed or variable length baseband layer one transmission frames, each of which is typically processed independently. Generally, standard bit error rate testers do not typically support measurements of distortions and errors in the waveform because many data distortions and errors (for example, frame loss, header corruption, etc.) are often only detected as a loss of sync, which does not accurately characterize the nature of the data distortions detected.

Further, conventional testing systems typically involve specialized transmitters or receivers, which are not be feasible for cost and/or scalability reasons. For example, bit error rate testers typically need a specialized circuit-based system where specialized testing messages are sent from the transmitting bit error rate tester to a receiving device and then looped back to the bit error rate tester. Often, bit error rate testers measure errors on a continuous basis, which may result in incorrect measurements when transmission frames are discarded or lost. Bit error rate testers also measure average bit error rates and do not provide data required to measure a time-varying characteristics of a communication.

Another example of a conventional system includes forward error correction, which corrects data distortions as the transmission frames are received. In one aspect, forward error correction is used in conjunction with interleavers configured to spread data fields within a layer one frame over time to overcome short time-scale distortions or losses. While forward error correction and/or interleavers ensure low error rates, forward error correction and/or interleavers do not provide detailed analysis of the channel of communication because errors are typically automatically corrected in transit by the interleaving decoders as the transmission frames are being decoded and, therefore, errors are not detected and analyzed.

Generally, packet testers are also used to test communication channels and measure end-to-end performance of packet-based communications. Packet testers typically work at the Ethernet or IP layer of the stack. Test packets in packet tester systems are typically encoded and interleaved in the transmitter, then deinterleaved and decoded in the receiver, resulting in the error rate typically being either zero or one, again losing information about what is happening on the channel. The interleaving and deinterleaving process of the packet tester systems results in a decrease in the number of dropped packets relative to the actual raw error rate (e.g. the time-varying characteristics) of a channel of communication, limiting its effectiveness as a means for measuring raw time-varying channel characteristics.

Adaptive coding and modulation is another conventional system that provides for transmitting modems to adapt the waveform parameters to current channel conditions, but does not provide detailed information about the channel, as the timescales over which adaptive coding and modulation operate are far too long for this purpose. Further, adaptive coding and modulation often does not look at the entire data frame in adapting the waveform parameters, using only a portion of the frame data. This means that adaptive coding and modulation may be analyzing too small a sample in time to capture important effects of misrouting or dropping of frames. Adaptive coding and modulation may also use single frequency measurement tones (also known as pilot tones) going back and forth through the system. However, this also presents very limited insight into the characteristics of the channel of communication as these single frequency measurement tones do not account for the entire channel, only a certain frequency at a certain time.

There is a need for a system that can measure the time-varying characteristics of an entire channel and the distortions that are generated during transmission. It is further desirable if such a system can be attached or adapted to existing hardware, as opposed to requiring specialty hardware.

SUMMARY

Accordingly, a system and method, intended to address the above-identified concerns, would find utility.

In accordance with one or more aspects of the present disclosure, a system for determining communication channel characteristics includes a transmitter comprising a bit sequence generator and a frame processing and modulator unit, where the frame processing and modulator unit is configured to generate a transmission frame comprising an embedded bit sequence generated by the bit sequence generator and at least one embedded side channel field, the transmitter further configured to transmit the transmission frame over a communications channel, a receiver in communication with the transmitter over the communications channel and configured to receive the transmission frame, and a data processor, in communication with the receiver through a data processor interface, configured to receive the transmission frame from the receiver, the processor further configured to process the transmission frame to detect and analyze distortions in a waveform corresponding to the transmission frame generated during the transmission over the communications channel based on the embedded bit sequence and the at least one embedded side channel field.

In accordance with one or more aspects of the present disclosure, a method of data communications includes generating a transmission frame, with a frame processing and modulator unit of a transmitter, comprising an embedded bit sequence generated by a bit sequence generator and at least one embedded side channel field, transmitting the transmission frame over a communications channel with the transmitter, receiving the transmission frame with a receiver in communication with the transmitter over the communications channel, receiving the transmission frame with a data processor in communication with the receiver through a data processor interface, and detecting and analyzing distortions of a waveform corresponding to the transmission frame, with the data processor, that are generated during transmission over the communications channel based on the embedded bit sequence and the at least one embedded side channel field.

In accordance with one or more aspects of the present disclosure, a method of data communication includes determining and analyzing, with a data processor of a receiving modem, time varying transmission characteristics of a communication channel based on an embedded bit sequence and at least one embedded side channel field that are included in a transmission frame, transmitted by a transmitter, receiving, with the transmitter, feedback related to the time varying transmission characteristics of the communications channel, and with the transmitter, adapting the transmission characteristics of a subsequent transmission frame based on the time varying transmission characteristics of the communications channel.

BRIEF DESCRIPTION OF THE DRAWINGS

Figure 1A:
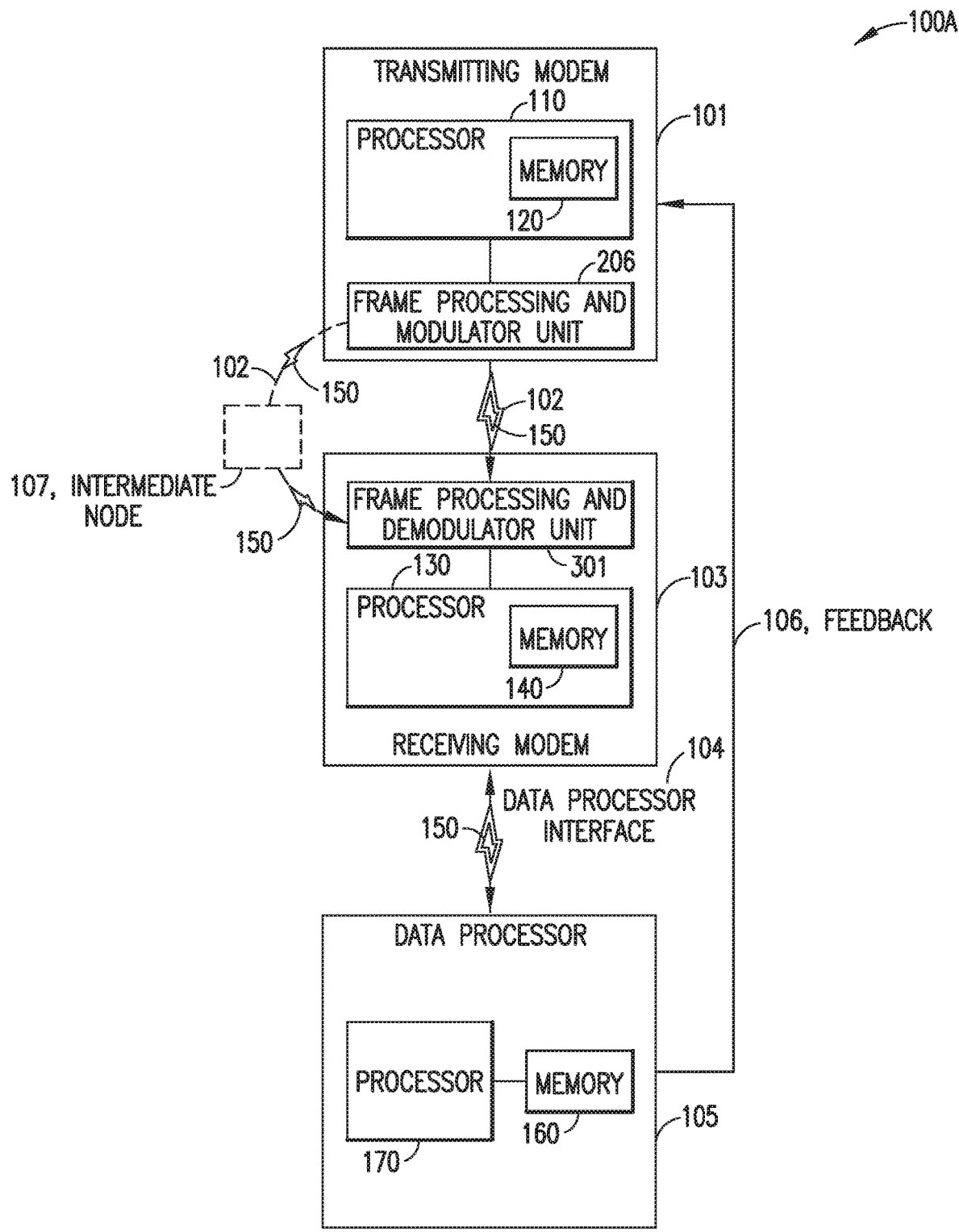
Figure 1B:
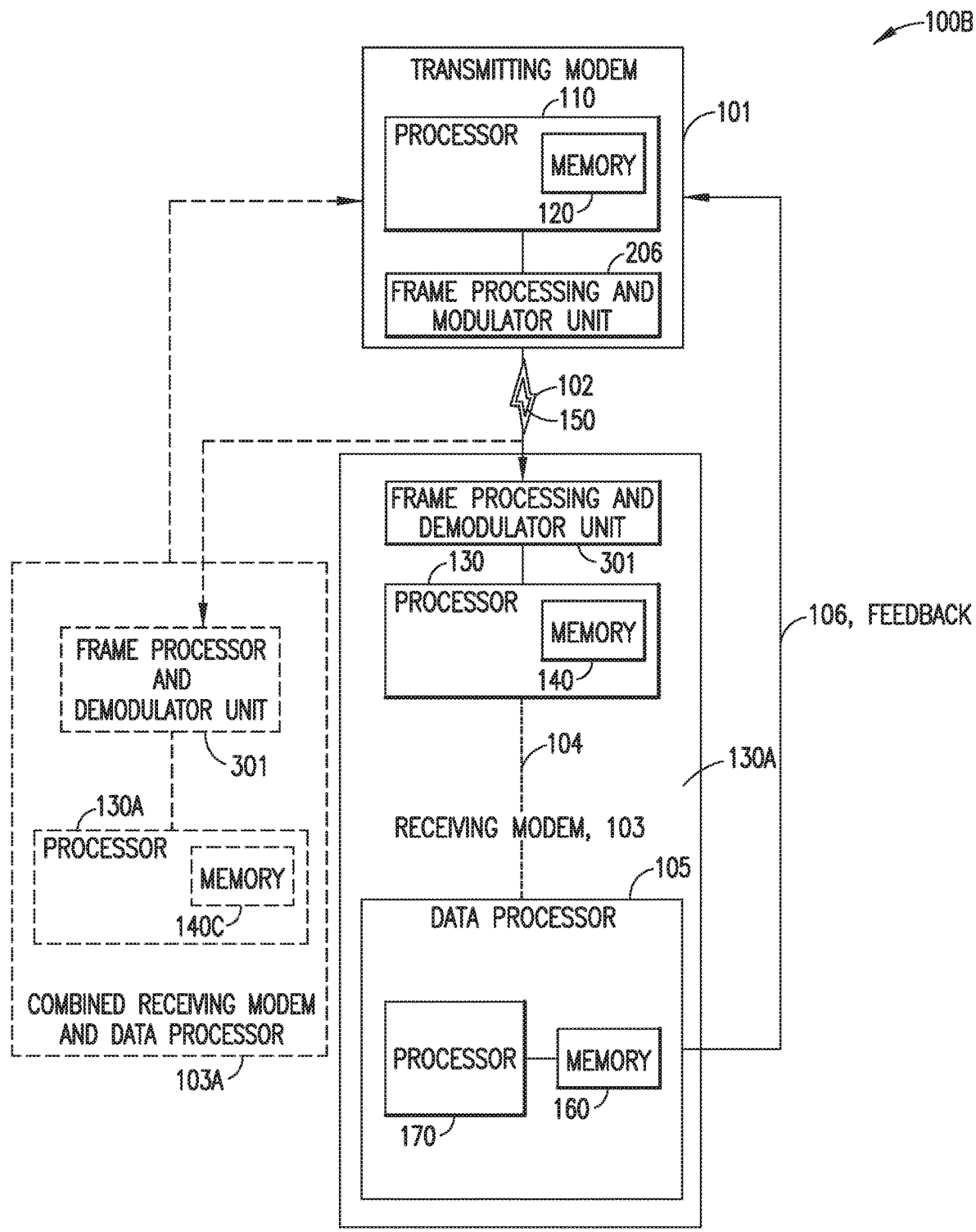
Figure 2:
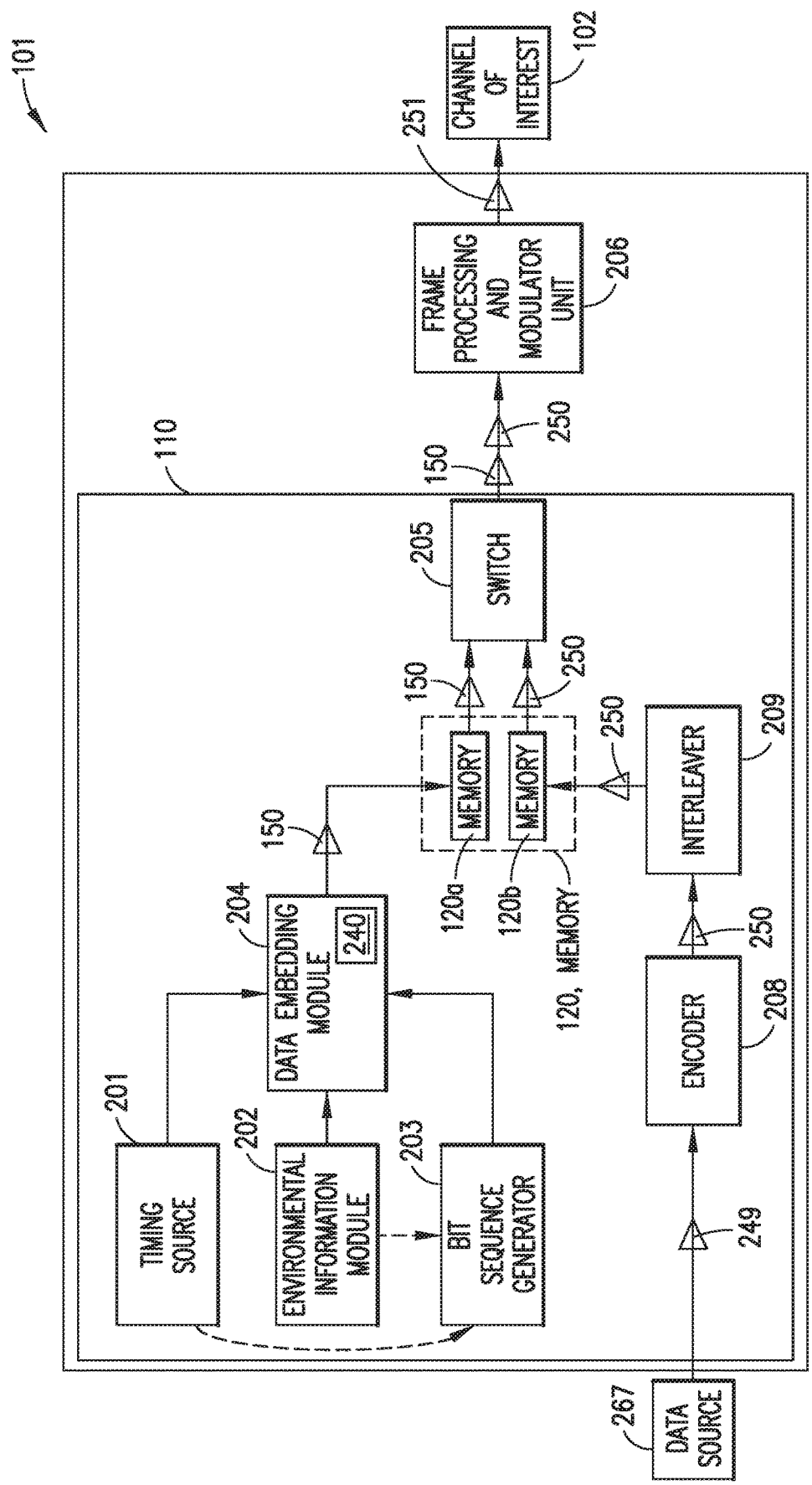
Figure 2B:
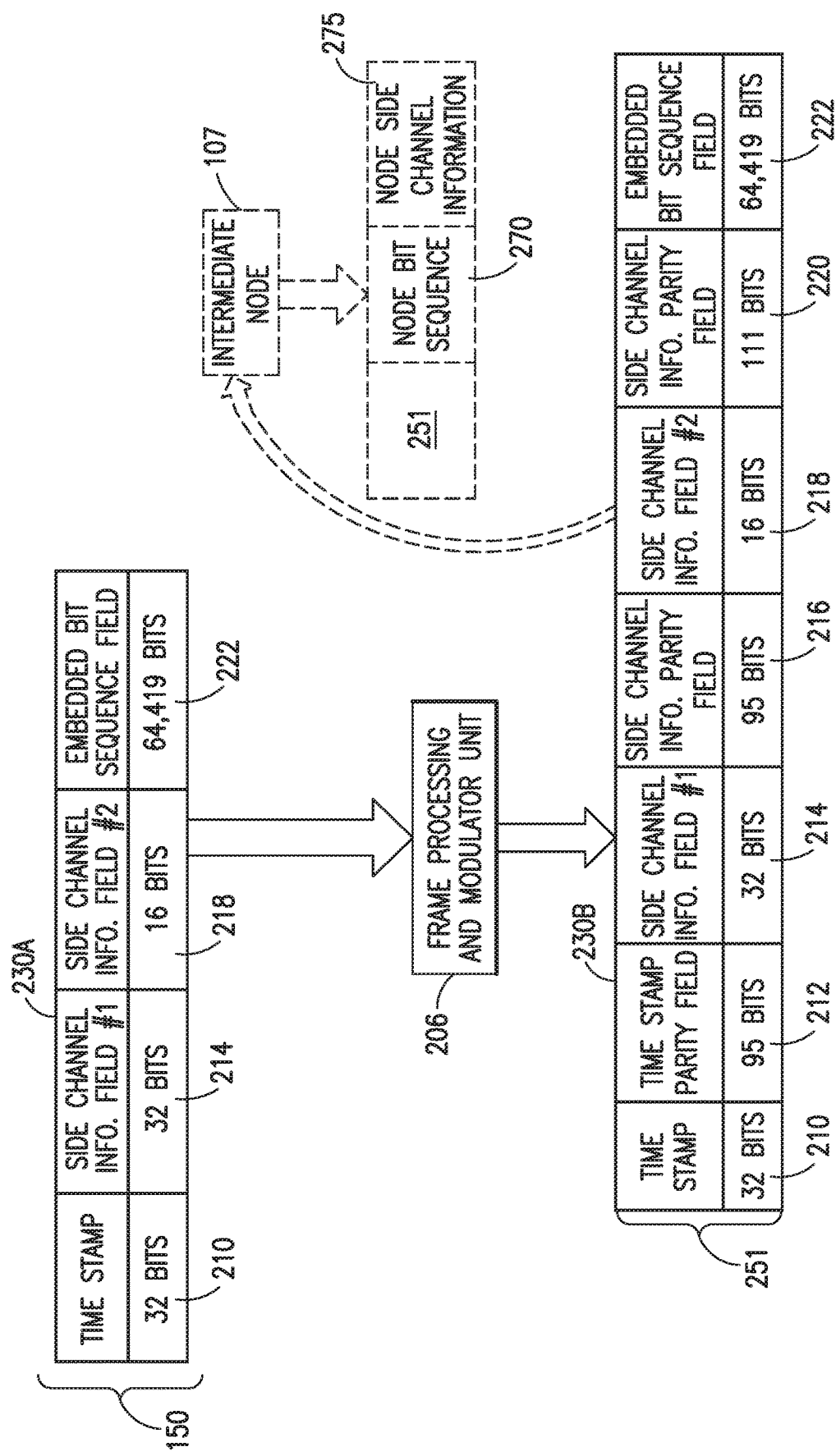
Figure 3:
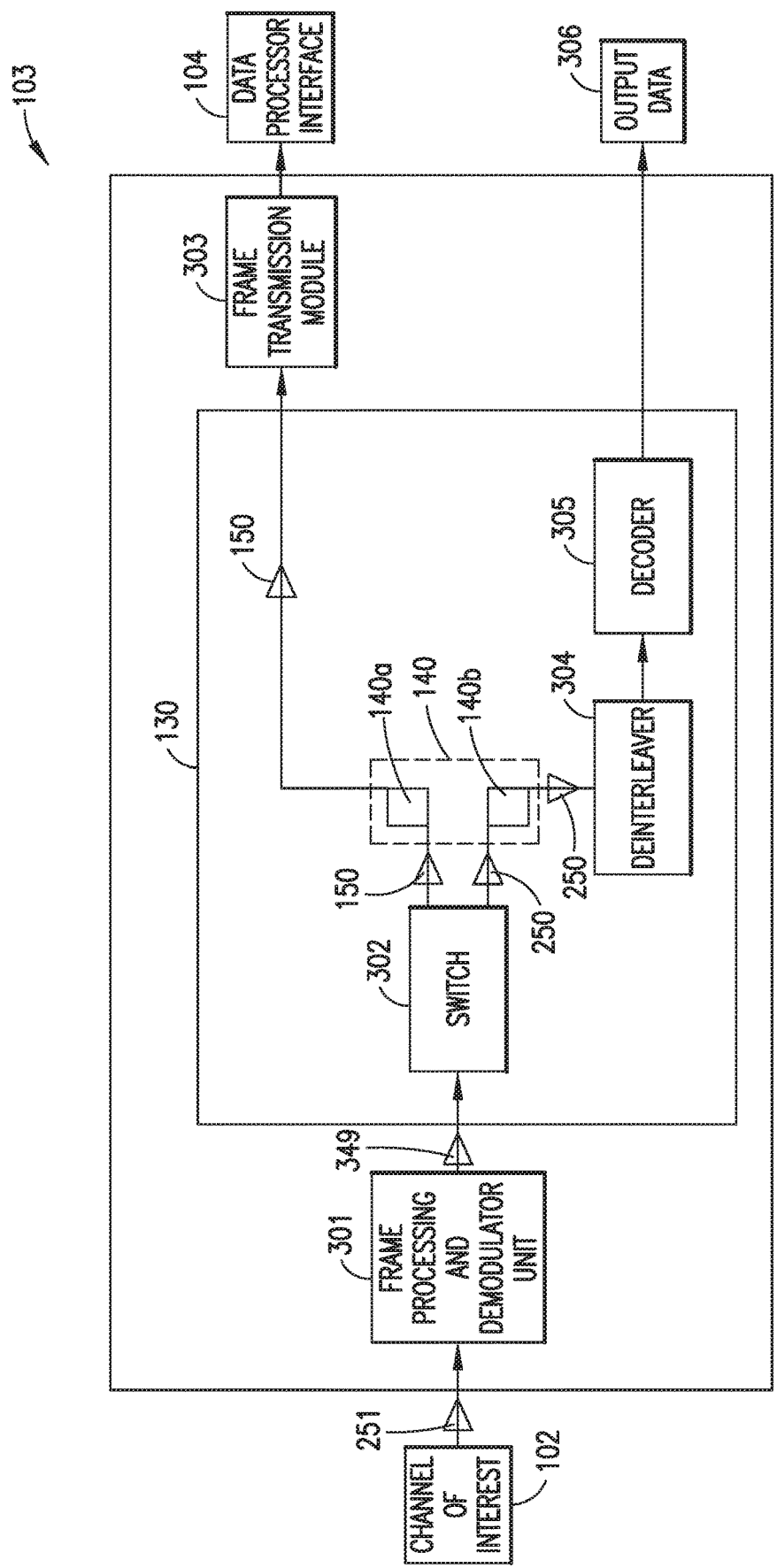
Figure 4:
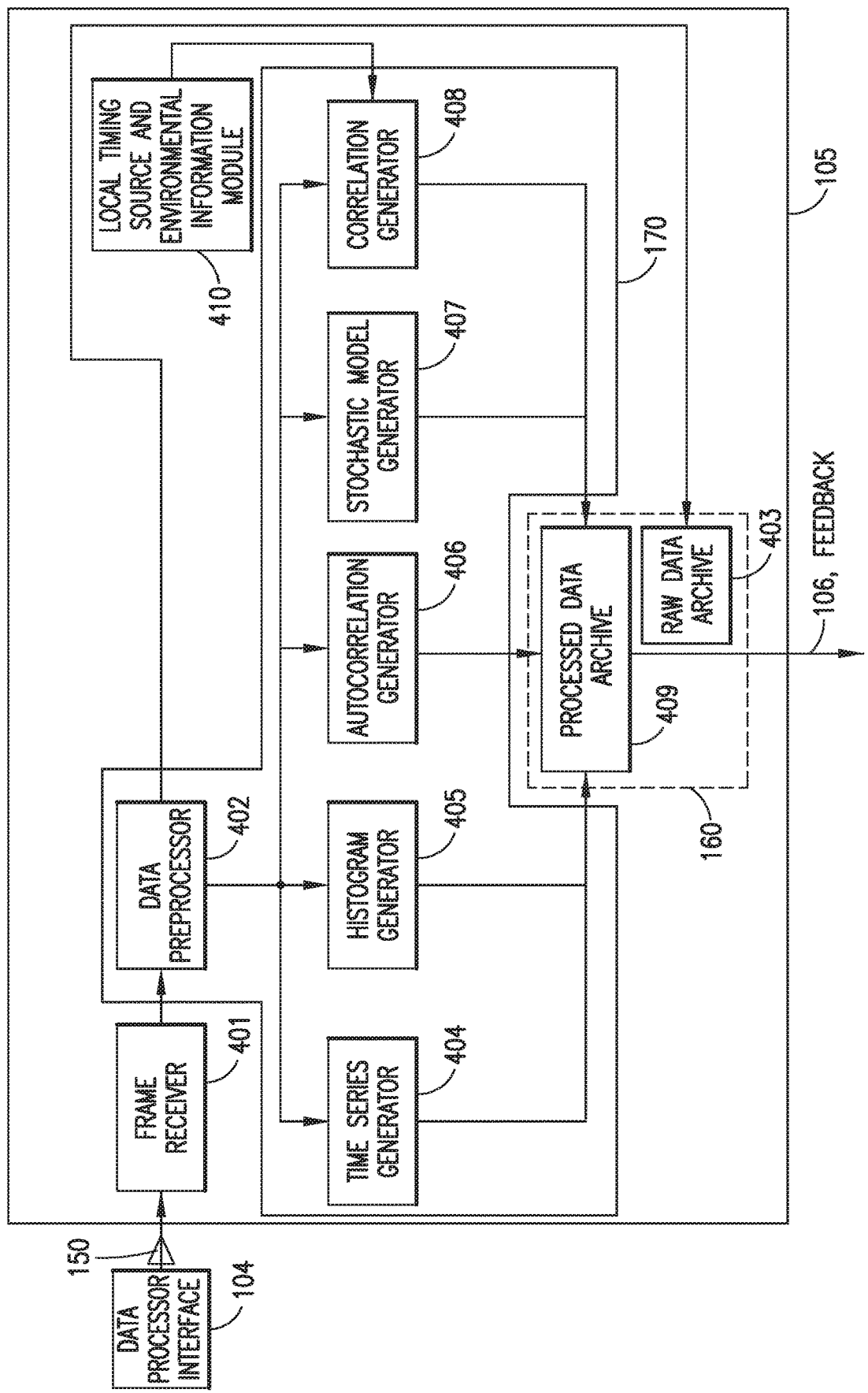
Figure 10A:
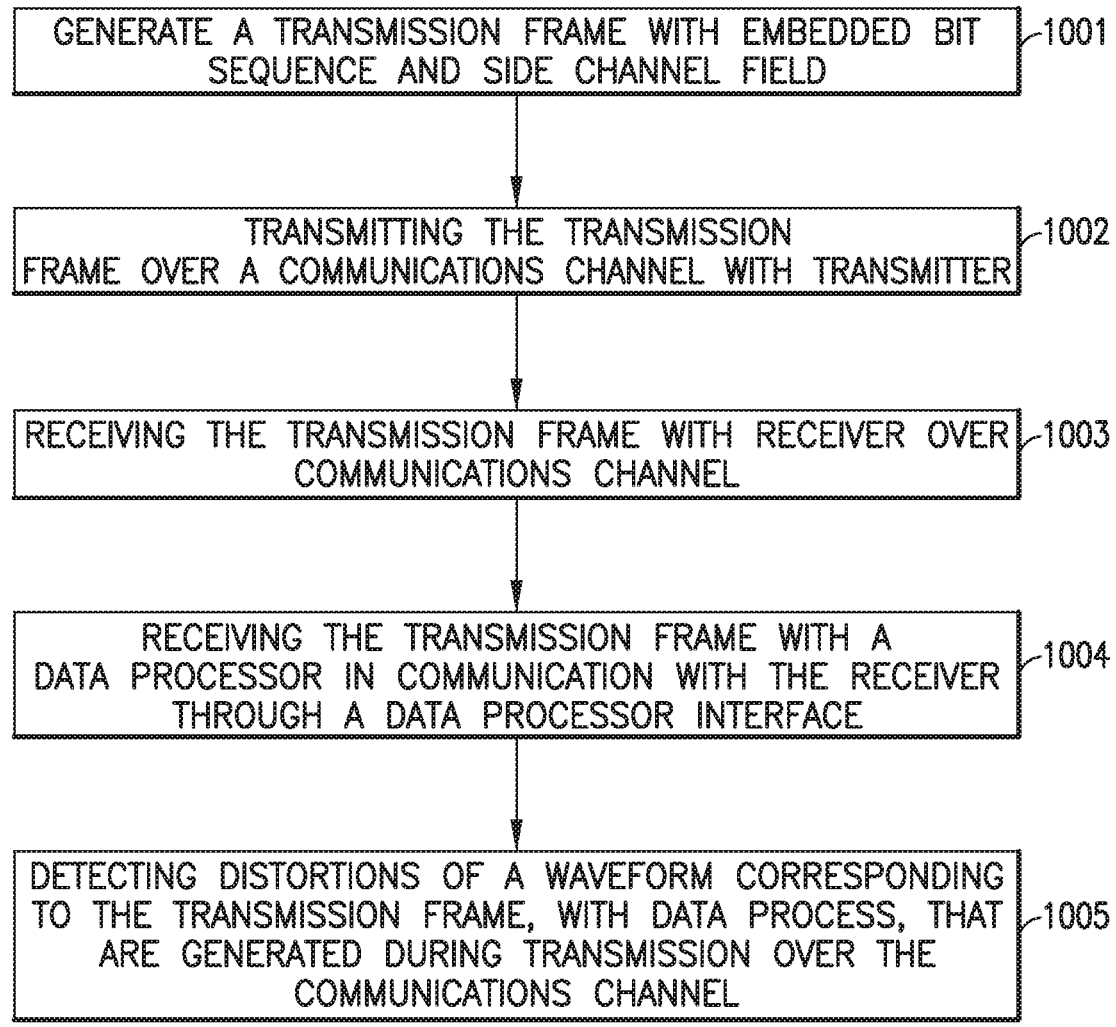
Figure 10B:
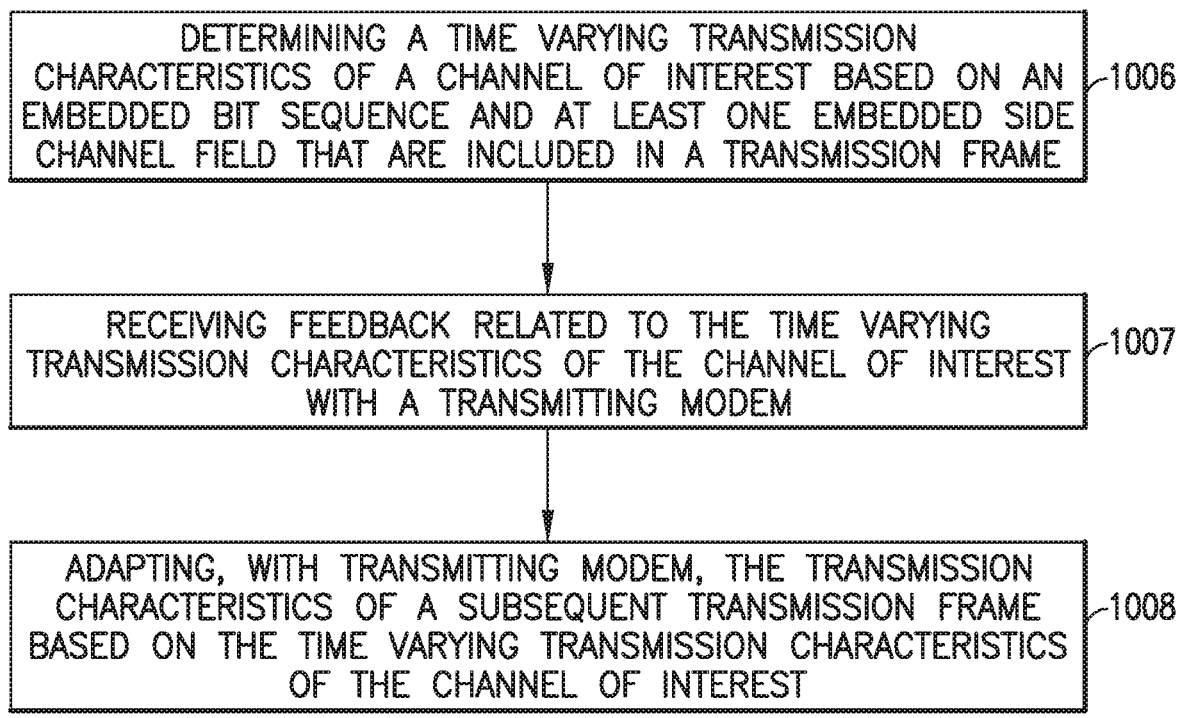
Figure 11:
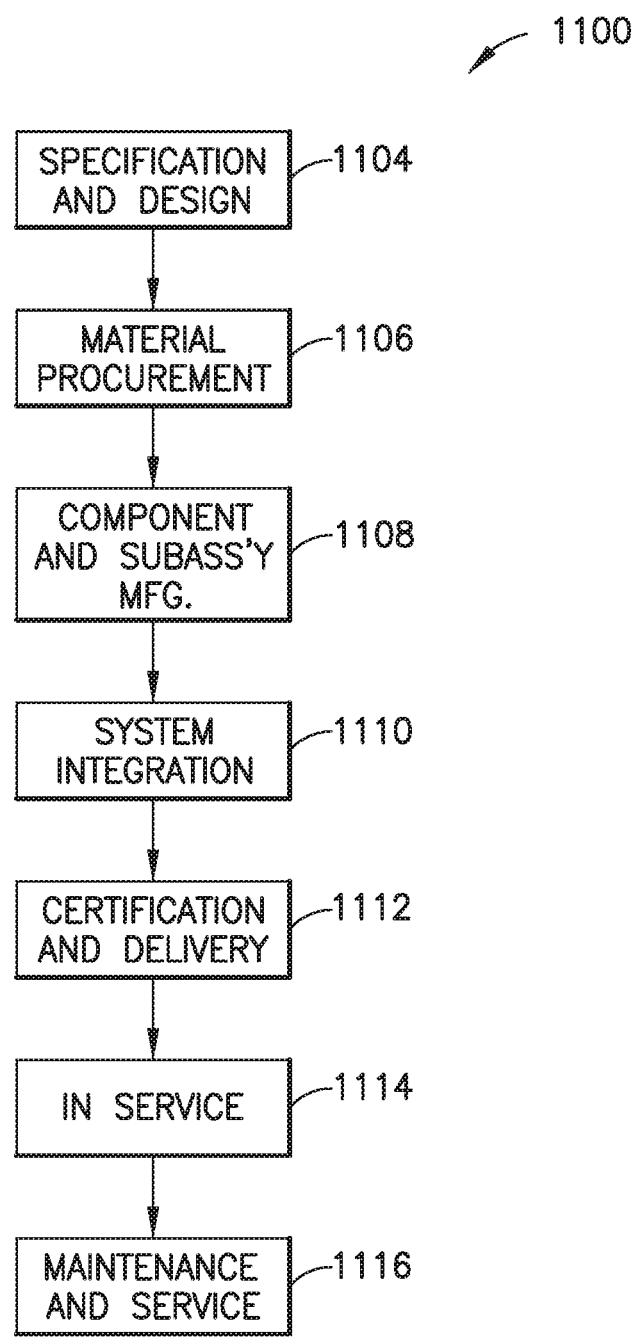
Figure 12:
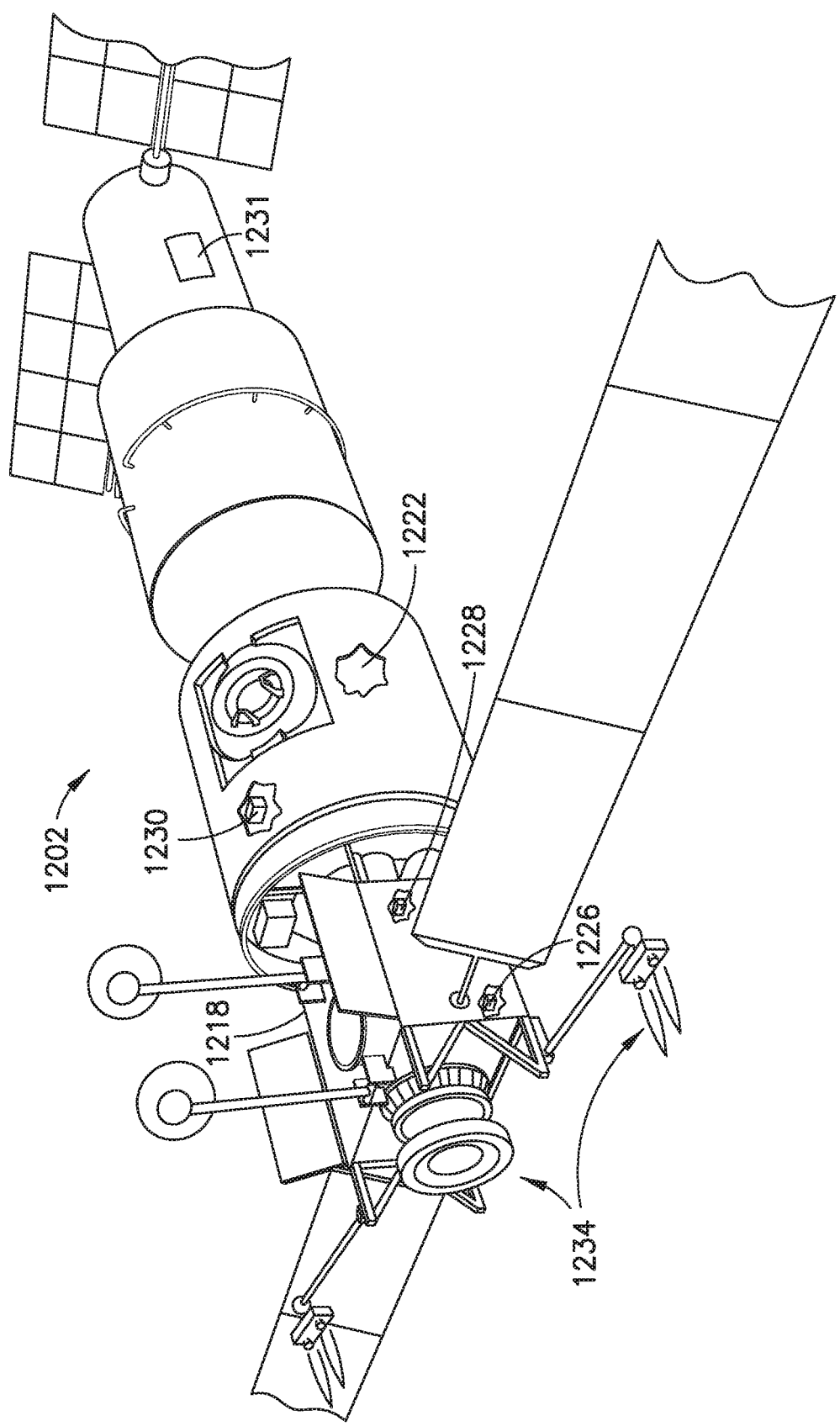

Having thus described examples of the disclosure in general terms, reference will now be made to the accompanying drawings, which are not necessarily drawn to scale, and wherein like reference characters designate the same or similar parts throughout the several views, and wherein:

FIGS. 1A-1B are exemplary block diagrams of a system for determining channel characteristics according to aspects of the present disclosure;

FIG. 2 is an exemplary block diagram of a transmitting modem of the system according to aspects of the present disclosure;

FIG. 2A is an exemplary diagram of an exemplary notational transmission frame according to aspects of the present disclosure;

FIG. 2B is an exemplary diagram of the operations of an exemplary frame processing and modulator unit according to aspects of the present disclosure;

FIG. 3 is an exemplary block diagram of a receiving modem of the system according to aspects of the present disclosure;

FIG. 4 is an exemplary block diagram of a data processor of the system according to aspects of the present disclosure;

FIGS. 5A-5C are exemplary illustrations of transmission characteristics data according to aspects of the present disclosure;

FIGS. 6-9 are exemplary illustrations of communications systems according to one or more aspects of the present disclosure;

FIGS. 10A-10B are exemplary method flow charts according to one or more aspects of the present disclosure;

FIG. 11 is a flow diagram of communication platform production and service methodology in accordance with one or more aspects of the present disclosure; and FIG. 12 is a schematic illustration of a communications platform in accordance with one or more aspects of the present disclosure.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings or connections other than those depicted in the block diagrams may also exist. Dashed lines, if any, connecting the various elements and/or components represent couplings or connections similar in function and purpose to those represented by solid lines; however, couplings or connections represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting. It is further noted that all numbers, temperatures, etc. are "about" and provided for exemplary purposes only. All specific numbers, temperatures and any other specific information may be more or less or any suitable number or temperature.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Referring to FIGS. 1A and 1B, systems 100A, 100B for determining channel characteristics of a communication channel are shown. The aspects of the present disclosure provide for detection and analyzation of distortions occurring during communications transmissions where the analyzation includes analyzing time-varying characteristics of a communication channel. The aspects of the present disclosure also provide for adjusting or adapting a transmission of data to compensate for potential data distortions. In one aspect, the system 100A includes a transmitting modem 101, a receiving modem 103 and a data processor 105. The transmitting modem 101 has a processor 110, a memory 120 and a frame processing and modulator unit 206, which is configured to transmit a waveform corresponding to a transmission frame 150 over a channel of interest 102. The receiving modem 103 receives the waveform corresponding to the transmission frame 150 by way of a channel of interest 102. In one aspect, an intermediate node 107 (shown in phantom) is disposed between the transmitting modem 101 and the receiving modem 103 and is configured to relay the transmission frame 150 from the transmitting modem 101 to the receiving modem 103. The receiving modem 103 further includes a frame processing and demodulator unit 301 which demodulates the waveform corresponding to the transmission frame 150, a processor 130 and a memory 140. The receiving modem 103 is interfaced with the data processor 105 through a data processor interface 104 and is configured to transmit the transmission frame 150 (corresponding to the demodulated waveform) to the data processor 105.

In one aspect, the data processor 105 is separate from the receiving modem 103 as shown in FIG. 1A. In other aspects, the data processor 105 is collocated with the receiving modem 103, or the functions of the data processor 105 are implemented within the receiving modem 103 as shown in FIG. 1B. The data processor 105 includes a processor 170 and a memory 160 configured to perform analysis of the data distortions and errors detected within the transmission frame 150 as described herein. In one aspect, the data processor 105 is configured to communicate feedback 106 to the transmitting modem 101 so that the transmitting modem 101 adapts the transmission characteristics of subsequent waveforms based on the data distortions detected by data processor 105 with respect to the transmission frame 150. In one aspect, the channel of interest 102 includes satellite communications channels, but in other aspects, the channel of interest 102 also includes terrestrial radio communication or other suitable communication channels.

In other aspects, as shown in FIG. 1B, the data processor 105 of the system 100B is an integrated component of the receiving modem 103 and the data processor interface 104 is the interface between the data processor 105 and the receiving modem 103. While two processors and memories are shown in FIG. 1B, in other aspects, a single processor and memory (shown in dashed lines in FIG. 1B as processor 130a and memory 140c of a combined receiving modem and data processor 103a) may be included to perform the functions of the receiving modem 103 and the data processor 105 described herein.

Referring now to FIGS. 1A, 1B and 2, an exemplary block diagram of the transmitting modem 101 is shown. In one aspect, the transmitting modem 101 is responsible for generating a bit sequence (such as, for example, a pseudorandom bit sequence or a bit pattern) and one or more side channel information (such as, for example, timestamps, environmental information or information related to the transmission of the transmission frame 150), combining the bit sequence and the side channel information into transmission frames 150 and sending those transmission frames 150 over the channel of interest 102 (as a waveform 251 corresponding to the transmission frame 150). The channel of interest 102 carries the transmission frames 150 to the receiving modem 103, which reconstructs the transmission frame 150 as much as possible. This reconstructed transmission frame 150 is passed to the data processor 105 over the data processing interface 104, and the data processor 105 performs the actual analysis of the channel of interest 102.

In one aspect, the transmitting modem 101 includes the processor 110, which includes, in one aspect, a timing source 201, an environmental information module 202, a bit sequence generator 203, a data embedding module 204, an encoder 208 which receives data from a data source 207, an interleaver 209 and a switch 205. In one aspect, the transmitting modem 101 also includes the frame processing and modulator unit 206. In one aspect, the transmitting modem 101 also has the memory 120 which, in one aspect, includes temporary memories 120a, 120b. In one aspect, the timing source 201 and environmental information module 202 are configured to generate side channel information pertaining to the transmission frame 150. The side channel information generated by the timing source 201 and environmental information module 202 includes information for determining when the transmission frame 150 was transmitted. In one aspect, as described herein, the side channel information generated by the timing source 201 and environmental information module 202 are subsequently decoded by the data processor 105 to facilitate the analysis of detected data distortions within transmission frames 150 that occur during transmission of the transmission frame 150 through the channel of interest 102. In one aspect, the timing source 201 is configured to generate a timestamp. In one aspect, the timestamp generated by the timing source 201 is an absolute time and date (e.g. it is a time and date determined by and maintained by an external time source). In one aspect, the absolute time and date generated by the timing source 201 is high precision and is derived from time and date information received from a GPS receiver, the time servers maintained by National Institute of Standards and Time (NIST) or other organizations, or another source of absolute time and date. In another aspect, the timestamp is a frame number of the transmission frame 150 (e.g. where frame number values are unique), provided that the frame rate and the time of the first transmission frame 150 is known. Each transmission frame 150 can, in one aspect, include an incrementing frame number as a timestamp. In other aspects, the timestamp is a relative frame number where the frame number values are repeated. The relative frame numbers are also referred to as sequence counts and also serve as the timestamp, provided that the frame rate and the time of the first frame is known and that it is possible to disambiguate between transmission frames 150 with the same sequence count. In yet other aspects, the timestamp is a combination of frame numbers, sequence counts or absolute time and date. In one aspect, additional side channel information (such as, for example, environmental information, or information related to the transmission of the transmission frame 150 as described in greater detail below) is also embedded in the transmission frame 150 in a manner substantially similar to that of the timestamp (which will be described in greater detail below).

In one aspect, the environmental information module 202 provides the additional side channel information related to conditions present at the transmitting modem 101 during the transmission of the waveform corresponding to the transmission frame 150. In one aspect, the side channel information, provided by the environmental information module 202, includes environmental information such as local weather conditions or weather phenomenon (e.g. sources of potential interference or distortions to the waveform). In yet other aspects, the side channel information provided by the environmental information module 202 includes any environmental data that might potentially affect the channel of interest 102 and the transmission of the waveform embodying the transmission frame 150 such as, for example, azimuth and elevation angles of a transmission antenna, rain, winds, humidity, barometric pressure, temperature, gyroscopic data and/or communication platform attitude info.

In one aspect, the bit sequence generator 203 generates a bit sequence which is sent over the channel of interest 102 as part of the transmission frame 150 and employed by the system 100A, 100B to determine the time-varying channel characteristics of the channel of interest 102. In one aspect, the bit sequence generator 203 generates a pseudorandom bit sequence. In one aspect, pseudorandom bit sequence is generated with any suitable pseudorandom algorithm, such as, for example, a 2^63−1 maximum length linear feedback shift register. In one aspect, the pseudorandom bit sequence generated by the bit sequence generator 203 is deterministic and is a function of one or more data from the environmental information module 202 or timing source 201. For example, in one aspect, the timestamp, the frame number and/or the sequence count/relative frame number is the input to deterministically generate a pseudorandom bit sequence with the bit sequence generator 203. A pseudorandom bit sequence generated by the bit sequence generator 203 facilitates the calculation of actual bit error rate by the system 100A, 100B. However, in other aspects, the bit sequence generator 203 is configured to generate a static, predetermined bit sequence (e.g. a predetermined binary string, also known as a predetermined bit pattern) instead of a pseudorandom bit sequence. The static, predetermined bit pattern remains the same and does not change between different transmission frames 150. A predetermined bit sequence generated by the bit sequence generator 203 facilitates the identification of lost or misdirected transmission frames 150 and/or packets.

Referring now to FIGS. 2 and 2A, in one aspect, the data embedding module 204 is configured to receive the side channel information from the timing source 201, the environmental information module 202 and/or the bit sequences from the bit sequence generator 203 and embed them into a notational transmission frame structure 230A to form the transmission frame 150 (as shown in FIG. 2A) embodied as a binary string (e.g. a string of bits encoded in binary). It is noted that all bit lengths shown in the notational transmission frame structure 230A and the arrangement of fields within the notational transmission frame structure 230A are exemplary and can have any suitable configuration or format. In one aspect, the notational transmission frame structure 230A includes a plurality of fields including, for example, the timestamp field 210 (including data from the timing source 201), as well as one or more side channel information fields 214, 218. In one aspect, any suitable side channel information fields are part of the notational transmission frame structure 230A. In one aspect, the notational transmission frame structure 230A also has the embedded bit sequence field 222, which is generated by the bit sequence generator 203.

Referring now to FIGS. 2 and 2A, in one aspect, the data embedding module 204 is further configured to interleave the one or more fields of the notational transmission frame structure 230A (such as, for example, one or more of the timestamp field 210, the side channel information fields 214, 218 and the embedded bit sequence field 222). Interleaving spreads the side channel information fields out as much as possible within the transmission frame 150. Interleaving mitigates burst errors by creating a more uniform distribution of errors within a transmission frame 150 over a predetermined period of time. In one aspect, the data embedding module 204 has a frame interleaver 240 which is configured to interleave the fields of the notational transmission frame structure 230A. In one aspect, the frame interleaver 240 is a block interleaver, like those in the DVB-S2 standard. In other aspects, the frame interleaver 240 includes any suitable interleaving mechanism or interleaving algorithm, such as, for example, uniform interleavers, convolutional interleavers, random interleavers or S-random interleavers. In yet other aspects, the data embedding module 204 does not interleave the data within the notational transmission frame structure 230A. In one aspect, the data embedding module 204 stores the transmission frame 150 within a temporary memory 120a. In one aspect, the temporary memory 120a is an onboard memory integrated with the processor 110. In other aspects, the temporary memory 120a is a part of the memory 120 (shown in phantom in FIG. 2) or other suitable memory for temporarily storing the notational transmission frame structure 230A in a buffer.

In one aspect, the transmitting modem 101 also receives user data 249 from a data source 207. In one aspect, the user data 249 from the data source 207 is network communications data and/or data payload which are conventionally sent through the transmitting modem 101. In one aspect, the user data 249 is sent to the encoder 208, which encodes the user data 249 into a user data transmission frame 250. The user data transmission frame 250 from the encoder 208 is then sent to the interleaver 209, which is configured to interleave the user data transmission frame 250 and store it in the temporary memory 120b (which is, in one aspect, a part of the memory 120 shown in phantom). In one aspect, the transmission frame 150 stored in the temporary memory 120a and the user data transmission frame 250 stored in temporary memory 120b are both sent to the switch 205. In one aspect, the switch 205 is part of the processor 110. In other aspects, the switch 205 is any suitable switch configured to switch between data sources. In one aspect, the switch 205 is configured so that the transmitting modem 101 switches between the user data transmission frame 250 stored in the temporary memory 120b and the transmission frame 150 stored in temporary memory 120a so the user data transmission frame 250 and the transmission frame 150 are sent in an alternating sequence or other predetermined sequence. In one aspect, the switch 205 is configured to switch back and forth between user data transmission frames 250 and the transmission frames 150 in temporary memories 120a, 120b on a relatively short time scale (e.g. for example, within milliseconds or sub-millisecond time scales). In other aspects, the switch 205 is configured to only send one type of transmission frame (either user data transmission frames 250 or transmission frames 150) over any predetermined time period.

Referring now to FIGS. 2, 2A and 2B, in one aspect, the switch 205 transfers the sequence of transmission frames 150 and user data transmission frames 250 to the frame processing and modulator unit 206. In one aspect, the frame processing and modulator unit 206 modulates the transmission frames 150 and user data transmission frames 250 into the waveforms 251 corresponding to the transmission frames 150 and the user data transmission frame 250 for transmission over the channel of interest 102 to the receiving modem 103. In one aspect, the frame processing and modulator unit 206 is further configured to generate parity fields (also known as error correction codes, and includes, for example, the timestamp parity field 212 and the side channel information parity fields 216, 220) corresponding to one or more of, e.g., the timestamp field 210 and the side channel information fields 214, 218 for error detection and correction purposes. In one aspect, the parity fields (e.g. the timestamp parity field 212 and the side channel information parity fields 216, 220) include any suitable systematic codes such as, for example, Bose, Chaudhur and Hocquenhem codes (also known as BCH codes, which are a class of cyclic error-correction codes). In other aspects, the parity fields also include non-systematic codes. In one aspect, the frame processing and modulator unit 206 embeds the parity fields (e.g. the timestamp parity field 212 and the side channel information parity fields 216, 220) into the notational frame structure 230A to form a notational waveform structure 230B corresponding to the waveform 251. In one aspect, the frame processing and modulator unit 206 is also configured to interleave the parity fields (e.g. the timestamp parity field 212 and the side channel information parity fields 216, 220) within the notational waveform structure 230B. As described above, in one aspect, the channel of interest 102 includes one or more intermediate nodes 107. In one aspect, the one or more intermediate nodes 107 are configured to embed a node bit sequence 270 or a node side channel information 275 into the waveform 251 corresponding to the transmission frame 150. In other aspects, the one or more intermediate nodes 107 do not embed any additional data into the waveform 251 corresponding to the transmission frame 150 and merely are configured to pass or relay the waveform 251 along the channel of interest 102. In one aspect, the node bit sequence 270 or node side channel 275 information embedded by the intermediate node(s) 107 can be used for detecting and analyzing distortions within the waveform 251 in a manner similar to that described below with respect to the side channel information fields 214, 218 and side channel information parity fields 216, 220.

Referring now to FIGS. 1A, 1B and 3, an exemplary block diagram of the receiving modem 103 is shown. In one aspect, the receiving modem 103 receives the waveforms 251 corresponding to the transmission frames 150 and user data transmission frames from the channel of interest 102 with the frame processing and demodulator unit 301. In one aspect, the receiving modem 103 also includes the processor 130, which includes a switch 302, the memory 140 (which includes, in one aspect, temporary memories 140a, 140b), a deinterleaver 304, a decoder 305 and a frame transmission module 303. The channel of interest 102 will impart some channel-specific degradation or distortion on the waveform corresponding to the transmission frame 150 during the transmission of the waveform 251 through the channel of interest 102. These degradations or distortions include, for example, bit flips (e.g. where the bits within the binary string of the transmission frame 150 are changed) caused by spurious signals caused by the equipment, non-flat channel response, gain ripples or group delay variations. In other aspects, degradations or distortions to the waveform 251 also includes transmission frame drops or transmission frame losses (e.g. where the transmission frame 150 is lost during the transmission through the channel of interest 102), multiplexing errors (e.g. where the transmission frames 150 are sent to the wrong receiving modem 103), or header insertions or removals (e.g. where headers are incorrectly inserted or deleted from the transmission frame 150). In yet other aspects, degradations and distortions to the waveform 251 also include distortions caused by possible interference (e.g. where a polarized signal sent through the channel of interest 102 with different polarization leaking in), atmospheric loss (caused by, for example, clouds, weather, dust or weather phenomenon), misaligned antennas (e.g. where the antenna of a transmitting modem 101 or receiving modem 103 are not pointed at the correct line of sight), adjacent systems interfering on a similar frequency or signal feedback.

In one aspect, the waveform 251 received by the receiving modem 103 is demodulated by the frame processing and demodulator unit 301 to convert the waveform 251 to a corresponding received transmission frame 349. In one aspect, the frame processing and demodulator unit 301 substantially reverses the operations performed by frame processing and modulator unit 206 of the transmitting modem 101. The received transmission frame 349 demodulated by the frame processing and demodulator unit 301 is sent to a switch 302, which is, in one aspect, part of the processor 130. The switch 302 determines whether the received transmission frame 349 from the frame processing and demodulator unit 301 includes bit sequence and side channel information fields, or if it includes user data. If the received transmission frame 349 includes user data, then the received transmission frame 349 is determined by the switch 302 to be the user data transmission frame 250. The user data transmission frame 250 is temporarily stored in the temporary memory 140b (which, in one aspect, is a part of the memory 140) by the switch 302 before being sent to the deinterleaver 304 and decoder 305, and being outputted as output data 306.

In one aspect, if the received transmission frame 349 from the frame processing and demodulator unit 301 is determined by the switch 302 as having the bit sequence and side channel information fields, then the received transmission frame 349 is determined by the switch 302 to be the transmission frame 150 and is temporarily stored in the temporary memory 140a (which, in one aspect, is a part of the memory 140) in a buffer before being sent to frame transmission module 303 which transfers the transmission frame 150 to the data processor 105 by way of the data processor interface 104. In one aspect, the data processor interface 104 has a relatively low error rate so as to not drastically change the channel characteristics imparted by the transmission of the waveform 251 corresponding to the transmission frame 150 through the channel of interest 102. In one aspect, the data processor 105 is in close geographic proximity to, or collocated with the receiving modem 103. In other aspects, the data processor 105 may be located so as to have any spatial relationship relative to the receiving modem 103. In one aspect, the data processor interface 104 is a local area network connection, or other direct connection. In other aspects (as shown in FIG. 1B), the data processor interface 104 is an interface within a receiving modem 103 and the data processor 105 is integrated within the receiving modem 103 or the data processor 105 and receiving modem 103 are part of the combined receiving modem and data processor 103a.

Referring now to FIGS. 1A, 1B, 2, 2A and 4, an exemplary diagram of the data processor 105 is shown. The data processor 105 includes the processor 170, which includes a frame receiver 401, a data preprocessor 402, and one or more analysis generators such as, for example, a time series generator 404, a histogram generator 405, an autocorrelation generator 406, a stochastic model (such as, for example, a Markov Model) generator 407 and a correlation generator 408. In one aspect, data processor 105 also includes a memory 160, which includes a raw data archive 403 and processed data archive 409. In one aspect, the frame receiver 401 of the data processor 105 receives the transmission frame 150 by way of the data processor interface 104. The frame receiver 401 transfers the transmission frame 150 to the data preprocessor 402. In one aspect, the data preprocessor 402 performs one or more preprocessing actions on the transmission frame 150 to prepare the transmission frame 150 for analysis of the channel characteristics of the channel of interest 102.

In one aspect, the data preprocessor 402 deinterleaves the received transmission frame, if the transmission frame 150 was interleaved by the data embedding module 204. The deinterleaving process performed by the data preprocessor 402 reconstructs the transmission frame 150 based on the waveform frame structure 230B sequence (as shown in FIG. 2B), decodes the side channel information fields (e.g. for example, timestamp field 210 and side channel information fields 214, 218) and the parity fields (e.g. the timestamp parity field 212 and the side channel information parity fields 216, 220) and matches the embedded bit sequence (e.g. the bit sequence in the embedded bit sequence field 222) to the bit sequence that was generated by the bit sequence generator 203. In one aspect, the data preprocessor 402 orders the transmission frames 150 by determining the timestamp, the frame number or sequence counts for each transmission frame 150. In one aspect, if a side channel information field or subfield cannot be decoded (e.g. due to data loss, corruption, or distortion of the waveform 251 during transmission), but can be inferred by the data preprocessor 402 (for example, by reconstructing the side channel information field using, for example, the timestamp parity field 212 and the side channel information parity fields 216, 220), then the inferred value of the side channel information field is substituted for the missing side channel information field by the data preprocessor 402. In one aspect, if the side channel information field or subfield cannot be decoded and cannot be inferred, then the transmission frame 150 is considered lost.

In one aspect, the data preprocessor 402 is also configured to identify and determine whether any transmission frames 150 were dropped or lost during transmission through the channel of interest 102. In one aspect, dropped or lost transmission frames 150 are identified by the data preprocessor 402 by looking at the timestamps, frame numbers and/or sequence counts of the transmission frames 150 and determining if any transmission frames are missing from the expected sequence of transmission frames 150 or if there are any unexpected gaps in the sequence of transmission frames 150. In one aspect, the data preprocessor 402 is also configured to synchronize the embedded bit sequence from the received transmission frame 150 with an expected bit sequence generated by the bit sequence generator 203 of the transmitting modem 101. In cases where the bit sequence is generated deterministically based on a relative sequence count (e.g. a relative frame number), the data preprocessor 402 is configured to disambiguate the received transmission frame 150 from another received transmission frame 150 that has the same sequence count. The data preprocessor 402 is then configured to determine the expected bit sequence corresponding to the disambiguated received transmission frame 150 generated deterministically by the pseudorandom bit sequence generator 203. In other aspects, where the bit sequence is deterministically determined as a function of a frame number, this step is not necessary. In one aspect, the data preprocessor 402 is also configured to compare the expected bit sequence given the synchronized relative sequence count or frame number with the bit sequence of the transmission frame 150 and determining if any bits within the bit sequence of the transmission frame 150 were flipped or missing. Any detected bit flips within the bit sequence of the transmission frame 150 would represent, for example, detected distortions, errors or interference introduced to the waveform 251 corresponding to the transmission frame 150 as the waveform 251 is communicated through the channel of interest 102.

Still referring to FIGS. 1A, 1B, 2, 2A and 4, in one aspect, the data generated by the data preprocessor 402 is archived for further analysis in the raw data archive 403, which is, in one aspect, part of the memory 160. In other aspects, the data generated by the data preprocessor 402 undergoes additional analysis by the processor 170. In one aspect, the data generated by the data preprocessor 402 is sent to the one or more analysis generators. For example, in one aspect, the data generated by the data preprocessor 402 is sent to the time series generator 404, which creates a time series analysis of the detected distortions and errors introduced by transmission through the channel of interest 102. An exemplary example of a time series analysis of the detected distortions and errors is shown in FIG. 5A. In one aspect, the time series analysis generated by the time series generator 404 represents the time-varying characteristics of the channel of interest 102 and the errors over time detected by the time series generator 404. In another aspect, data from the data preprocessor 402 is sent to the histogram generator 405 which generates an error histogram illustrating the distribution of errors based on the data from the data preprocessor 402. For example, the resulting error histogram is substantially similar to the exemplary error histogram shown in FIG. 5C. In one aspect, the error histogram shown in FIG. 5C represents the errors that appear most frequently as part of the transmission frame 150. In one aspect, the error histogram shown in FIG. 5C also provides for determination of which part of the transmission frame can be adjusted by a transmitting modem 101 to minimize errors within the waveform 251 corresponding to the transmission frame 150 as the waveform 251 is transmitted over the channel of interest 102.

In yet other aspects, data from the preprocessor 402 is sent to the stochastic model generator 407 to generate a stochastic model, such as, for example, the Markov model, of the error states. In one aspect, an exemplary Markov model generated by the stochastic model generator 407 is shown in FIG. 5B. In one aspect, the exemplary Markov model as shown in FIG. 5B models the randomly changing errors detected within the waveform 251 corresponding to the transmission frame 150 as it is transmitted through the channel of interest 102. The exemplary Markov model of FIG. 5B models the future state of errors depending on the present state of each bit within a predetermined bit sequence. The Markov model of FIG. 5B provides for the determination of errors that will arise given a specific input of the transmission frame 150. In one aspect, data from the data preprocessor 402 is sent to the autocorrelation generator 406 to generate autocorrelation of distortions and errors detected by the data preprocessor 402 within the received transmission frame 150 with a potential cause. In one aspect, by looking at decoded side channel information fields 214, 218 of the transmission frame 150, the autocorrelation generator 406 determines if the side channel information fields 214, 218 provide any information or insight regarding a potential distortion or error. For example, the autocorrelation generator 406 is configured to, in one aspect, determine the channel autocorrelation properties of the channel of interest 102 (including, for example, the channel memory and/or the channel time constant of the channel of interest 102). In one aspect, the autocorrelation properties of the channel of interest 102 provide statistical data for analysis of distortions detected within the transmission frames 150. In yet another aspect, the data from the data preprocessor 402 is combined with local timing sources and environmental information module 410 to generate additional correlated error analysis with the correlation generator 408. The correlation generator 408, in one aspect, is configured to correlate the distortions detected within the transmission frames 150 against phenomenon at the transmitting modem 101 or the receiving modem 103 or both, employing timing sources and environmental information local to the receiving modem 103 (e.g. weather phenomenon local to the receiving modem 103, antenna azimuth and attitude of the receiving modem 103 and other suitable side channel information) as well as timing sources 201 and environmental information from the environmental information module 202 of the transmitting modem 101. In one aspect, the correlation generator 408 determines potential causes for distortions to the waveform 251 by correlating detected errors and distortions within the received transmission frame 150 to environmental conditions local to the receiving modem 103 or the transmitting modem 101. In one aspect, the information from the analysis generators 402 and 404-408 is saved for further analysis within the processed data archive 409, which is part of the data processor memory 160.

In one aspect, the data stored within the processed data archive 409 is communicated to the transmitting modem 101 as feedback 106 to facilitate substantially real-time adaptation of waveforms 251 corresponding to transmission frames 150 by the transmitting modem 101. In one aspect, in response to the feedback 106 from the data processor 105, the transmitting modem 101 dynamically adjusts subsequent transmission frames 150 and their corresponding waveform 251 to embed transmission data in such a way so as to mitigate or minimize data distortion or data loss. For example, in one aspect, where certain parts of the transmission frame 150 are lost upon transmission by way of the channel of interest, the transmitting modem 101 is configured to adjust the transmission frame 150 and waveform 251 to minimize critical data within the portions of the transmission frame 150, identified in the feedback 106, that are often lost during transmission. In other aspects, the transmitting modem 101 is configured to adjust the waveform 251 by, for example, changing the bandwidth of a transmission to a wider or narrower band channel. In another aspect, the transmitting modem 101 is configured to adjust the waveform 251 by, for example, changing the code rate in response to diurnal variations in the channel of interest 102, changing the data rate in response to short bursts of errors, or adjust the interleaver depth to adjust how much time transmission frame data is spread over. In yet other aspects, the transmitting modem 101 is configured to adjust the waveform 251 by, for example, adjusting which carriers or subcarriers are employed, or adjusting the modulation mode of the transmission to enhance spectral efficiency or adjust transmitting power.

In yet other aspects, the data processor 105 is configured to provide feedback 106 to the receiving modem 103 to improve receiving modem 103 performance. For example, the receiving modem 103 is configured to use the feedback 106 to better estimate signal-to-noise ratios for received transmission frames 150. The signal-to-noise ratio enhanced with the feedback 106 is configured to provide for the receiving modem 103 to better manage and allocate receiving modem 103 resources according to the feedback 106, such as, for example, allocation of decoder cores for decoding received transmission frame 150. Processing of the feedback 106 by the receiving modems 103 ensures that a single decoder core is not devoted to processing multiple low signal-to-noise ratio transmission frames 150 so more resources are allocated to high signal-to-noise transmission frames 150 instead. In other aspects, the receiving modem 103 is also configured to perform some of the preprocessing actions such as, for example, deinterleaving the transmission frames 150, decoding side channel information, identify dropped frames, synchronizing with the transmitted pseudorandom bit sequence and identifying flipped bits within the received transmission frame 150 on received transmission frames 150 to provide a way to estimate signal-to-noise ratio to improve decoding.

Figure 6:
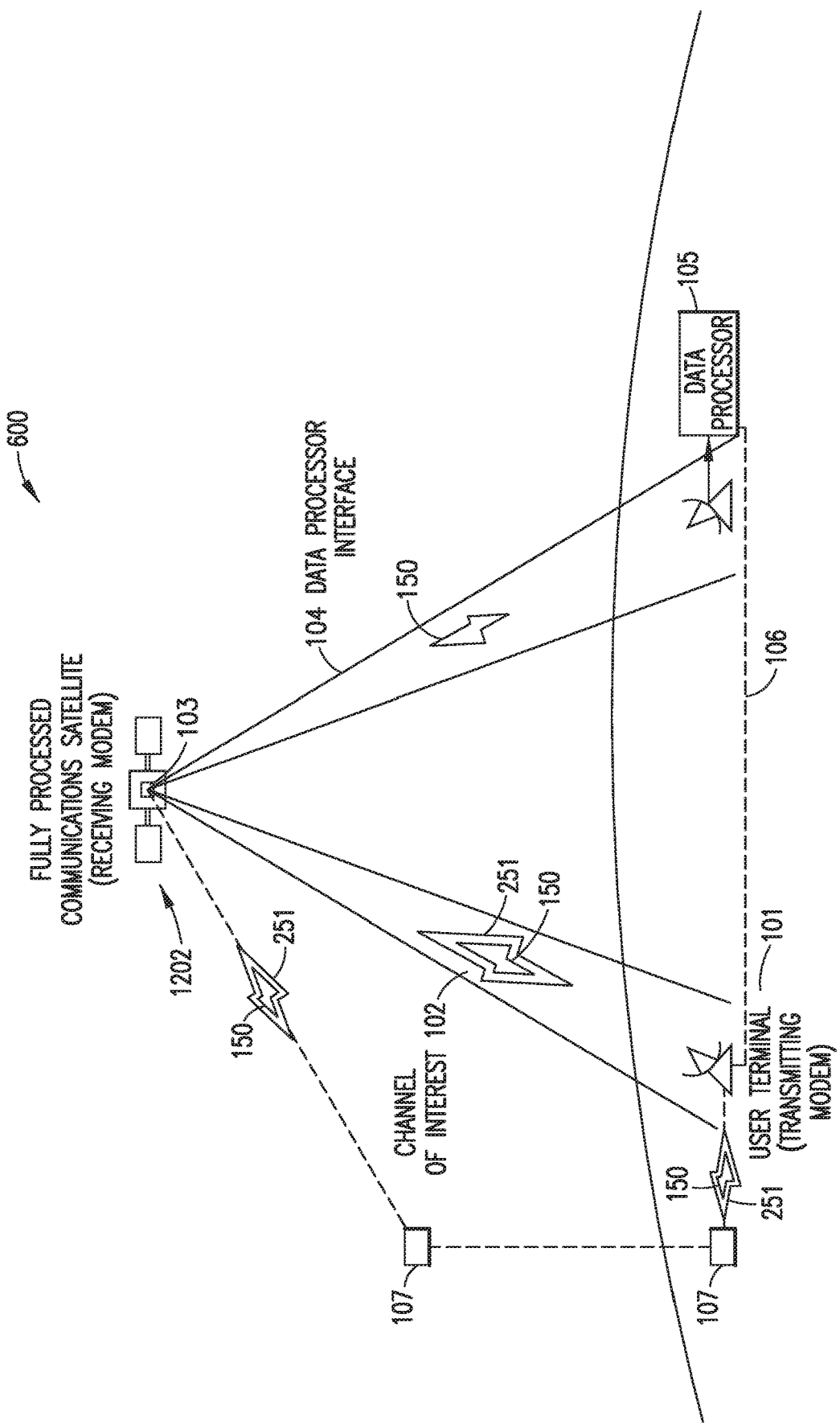

Referring now to FIGS. 6-9, different exemplary aspects of the systems 100A, 100B for determining channel characteristics are shown. In one aspect, FIG. 6 illustrates an exemplary diagram of an aspect of a fully processed satellite communication system 600 in accordance with aspects of the present disclosure. In one aspect, the fully processed satellite communication system 600 is "fully processed" in the sense that the satellite includes, for example, onboard demodulators, modulators, decoders and encoders which are configured to fully demodulate, decode, reencode and remodulate the waveform 251 onboard the satellite. The fully processed satellite communication system 600 includes the transmitting modem 101, the channel of interest 102, the receiving modem 103 (which is, e.g., part of a satellite 1202), the data processor interface 104, the data processor 105 and the feedback 106. In one aspect, the receiving modem 103 shown in FIG. 6 has demodulators, modulators, decoders and encoders onboard the satellite, as described above, so that the receiving modem 103 demodulates and decodes the received waveform 251 transmitted through the channel of interest 102 from the transmitting modem 101, such as a user terminal, and convert the waveform 251 to a transmission frame 150. In one aspect, the channel of interest 102 has one or more intermediate nodes 107 (shown in dashed lines) between the transmitting modem 101 and the receiving modem 103 as described above. Then, in one aspect, the receiving modem 103 retransmits the transmission frame 150 to the data processor 105 via the data processor interface 104, which, in turn, processes the transmission frame 150 as substantially described above. In one aspect, the data processor 105 sends feedback 106 to the transmitting modem 101 in any suitable manner (such as through the satellite 1202, ground based communications, etc.) to facilitate the adjustment or adaptation of the waveform 251 by the transmitting modem 101. While FIG. 6 illustrates a system for analyzing an uplink connection of the channel of interest 102, in one aspect, it is understood that the system 600 can also be adapted to measure, for example, the time-varying characteristics of the downlink connection (e.g. the data processor interface 104) by itself or in addition to the uplink connection (e.g. the channel of interest 102) independently and substantially simultaneously so long as the receiving modem 103 has the same capabilities as the transmitting modem 101 (e.g. is configured to embed a bit sequence field and/or embedding one or more side channel information data fields within the transmission frame 150).

Figure 7:
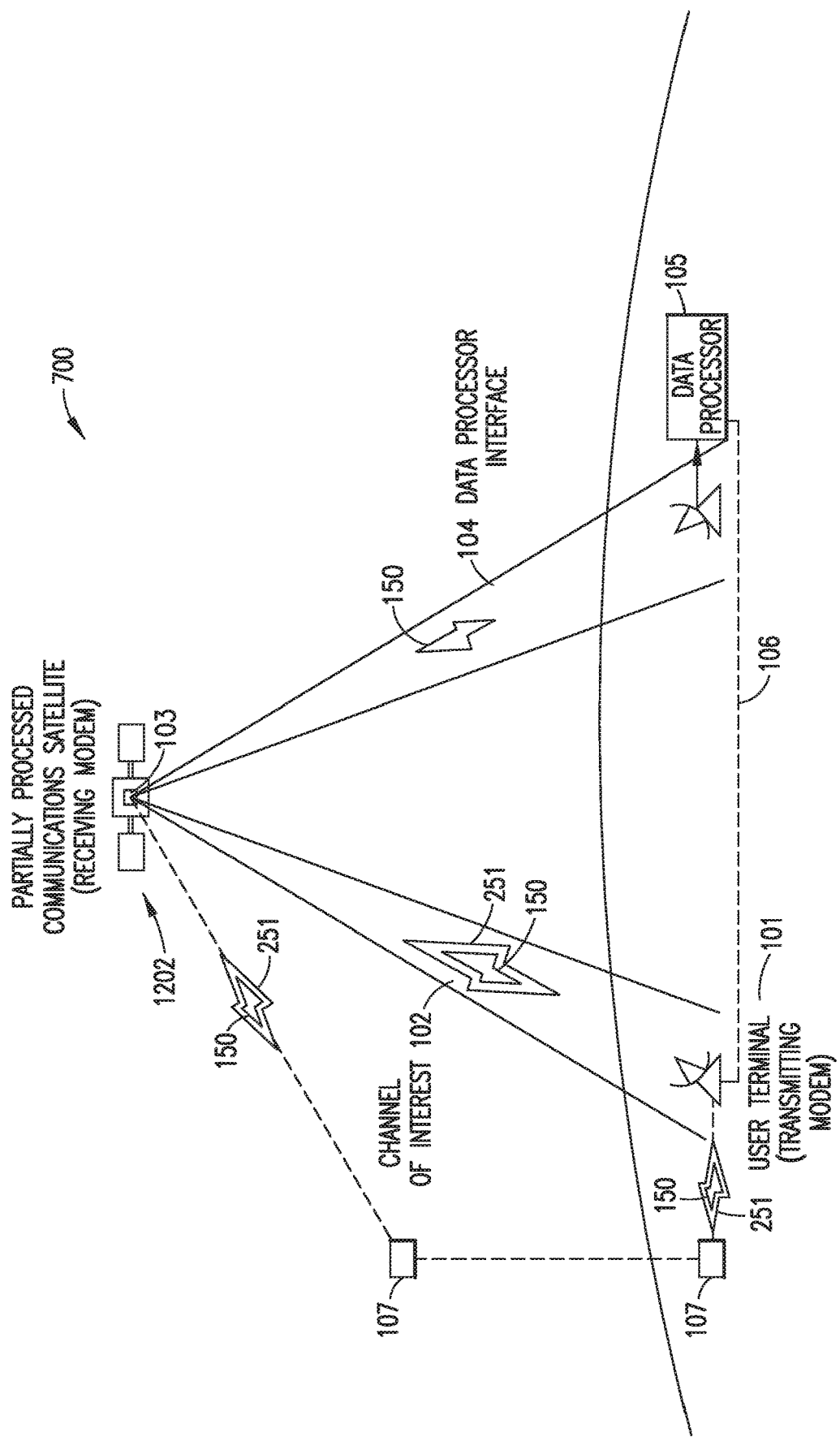

In one aspect, FIG. 7 illustrates an exemplary diagram of an aspect of a partially processed satellite communication system 700 in accordance with aspects of the present disclosure. In one aspect, the partially processed satellite communication system 700 is "partially processed" in the sense that the satellite includes, for example, onboard demodulators which are configured to demodulate the waveform 251 onboard a satellite without decoding the waveform 251. The partially processed satellite communication system 700 includes the transmitting modem 101, the channel of interest 102, the receiving modem 103 (which is a part of, e.g., the satellite 1202), the data processor interface 104, the data processor 105 and the feedback 106. Similar to the fully processed satellite communication system 600, in one aspect, the channel of interest 102 of the partially processed satellite communication system 700 has one or more intermediate nodes 107 (shown in dashed lines) between the transmitting modem 101 and the receiving modem 103 as described above. The system 700 shown in FIG. 7 is similar to the system 600 illustrated in FIG. 6, but, in this aspect, the receiving modem 103 is configured to receive the waveform 251 in the form of a wireless signal, demodulate the signal into the raw bits of the transmission frame 150 and then resend the raw bits of the transmission frame 150 to the data processor 105 over the data processor interface 104 without decoding the raw bits. System 700 provides for the receiving modem 103 offloading the decoding process to the data processor 105, thereby reducing power consumption on the receiving modem 103 (which is part of the satellite 1202), where energy resources may be limited. As with system 600, it is understood that the system 700 can also be adapted to measure, for example, the time-varying characteristics of the downlink connection (e.g. the data processor interface 104) by itself or in addition to the uplink connection (e.g. the channel of interest 102) independently and substantially simultaneously so long as the receiving modem 103 has the same capabilities as the transmitting modem 101 (e.g. is configured to embed a bit sequence field and/or embedding one or more side channel information data fields within the transmission frame 150).

Figure 8:
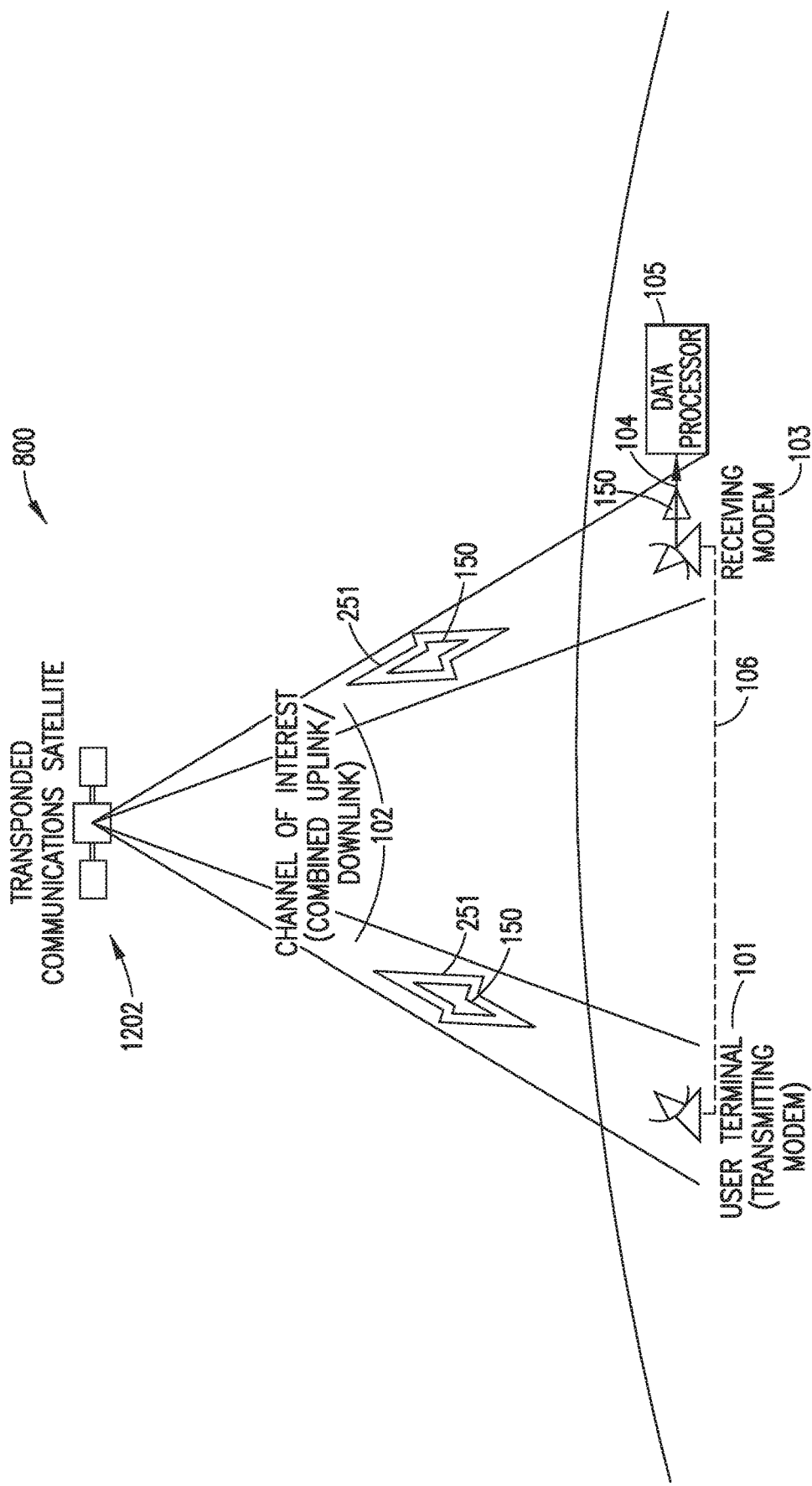

In one aspect FIG. 8 illustrates an exemplary diagram of an aspect of a transponded satellite communication system 800 in accordance with aspects of the present disclosure. In one aspect, transponded satellite communication system 800 is "transponded" in the sense that the satellite is configured to receive, amplify and retransmit the waveform 251 without demodulating or decoding the waveform 251. The transponded satellite communication system 800 includes the transmitting modem 101, a satellite 1202, the channel of interest 102 (which includes a combined uplink/downlink), the receiving modem 103, the data processor interface 104, the data processor 105 and the feedback 106. In one aspect, the transmitting modem 101 and the receiving modem 103 are both terrestrial. The satellite 1202 is configured to receive the waveform 251 from the transmitting modem 101 and rebroadcasts the same waveform 251 (albeit amplified) to the ground based receiving modem 103 via the channel of interest 102. The receiving modem 103 is then configured to transmit the waveform 251 to the data processor 105, which is, in turn, configured to send feedback 106 to the transmitting modem 101.

Figure 9:
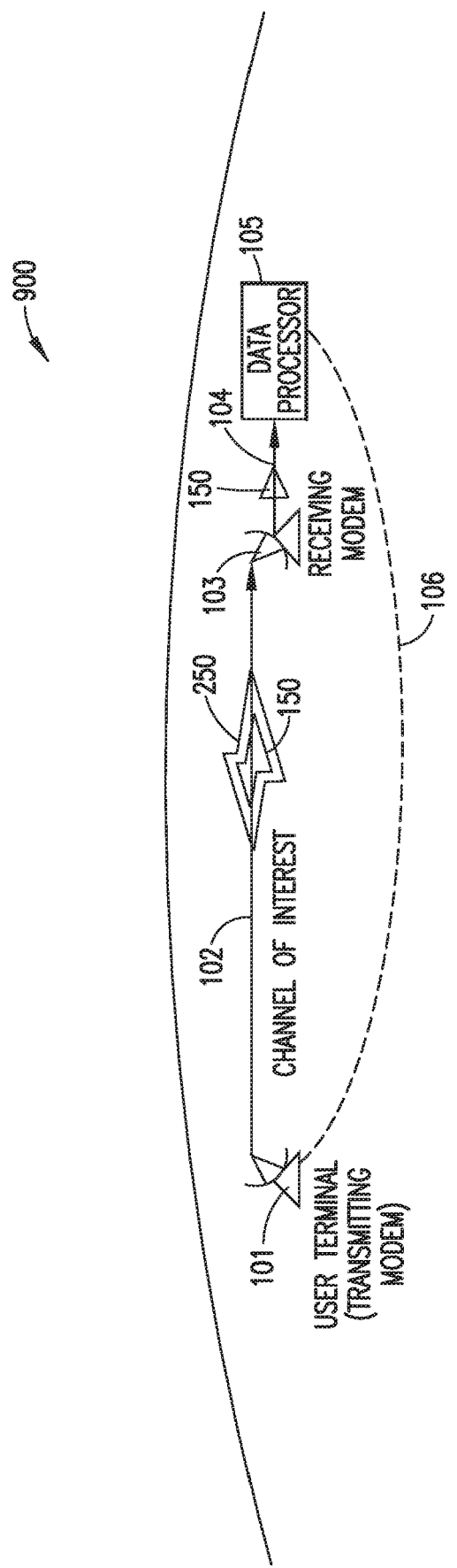

In one aspect, FIG. 9 illustrates an exemplary diagram of an aspect of a terrestrial line of sight communication system 900 in accordance with aspects of the present disclosure. The terrestrial line of sight communication system 900 includes the transmitting modem 101, the channel of interest 102, the receiving modem 103, the data processor interface 104, the data processor 105 and the feedback 106. In one aspect, both the transmitting modem 101 and receiving modem 103 are terrestrial and the waveform 251 corresponding to the transmission frame 150 is transmitted over the channel of interest 102.

Referring now to FIGS. 10A-10B, as well as FIGS. 1A-1B and 6-9, exemplary flowcharts illustrating the operation of the systems 100A, 100B, 600, 700, 800 and 900 are shown. At block 1001 of FIG. 10A, the transmission frame 150 is generated by the processor 110 and memory 120 of the transmitting modem. In one aspect, the transmission frame 150 is generated by embedding the bit sequence with one or more side channel information fields as described above. In one aspect, as described above, the processor 110 and memory 120 of the transmitting modem is also configured to interleave the one or more side channel information fields (e.g. the timestamp 210, the additional side channel information fields 212, 214, 216, 218, 220) with the embedded bit sequence 222 to spread out the side channel information as much as possible within a frame. In one aspect, the frame processing and modulator unit 206 is configured to modulate the transmission frame 150 into the waveform 251 corresponding to the transmission frame 150 for transmission. At block 1002, the transmission frame 150 is transmitted over the channel of interest 102 by the transmitting modem 101 as a waveform 251 corresponding to the transmission frame 150. At block 1003, the waveform 251 corresponding to the transmission frame 150 is received by the receiving modem 103 by way of the channel of interest 102. In one aspect, the channel of interest 102 will impart some channel-specific distortions or degradation to the waveform 251 as described above. In one aspect, the receiving modem 103 is configured to demodulate the waveform 251 back to the transmission frame 150. At block 1004, the data processor 105 receives the transmission frame 150 from the receiving modem 103 with the data processing interface 104. At block 1005, the data processor 105 detects distortions of the waveform 251 corresponding to the transmission frame 150 that are generated during transmission of the waveform 251 over the channel of interest 102. In one aspect, as described above, the data processor 105 performs several preprocessing actions in order to prepare for analyzing channel characteristics, including, for example, deinterleaving the transmission frames 150, decoding side channel information, identifying dropped frames, synchronizing with the transmitted pseudorandom bit sequence and identifying flipped bits within the transmission frame 150. In one aspect, as described above, the data processor 105 further analyzes the information determined by the preprocessing actions to determine channel characteristics of the channel of interest 102. The analysis by the data processor 105 includes, for example, generating error analysis models based on a moving average time series of bit error rate, bit error histograms, autocorrelating properties of the channel of interest 102, generating stochastic models of the channel of interest 102 and correlating results against environmental information related to the receiving modem 103. In one aspect, the error analysis models generated by the processor 170 of the data processor 105 are transmitted back to the transmitting modem 101 or the receiving modem 103 to adapt the waveforms 251 corresponding to subsequent transmission frames 150 to compensate for or overcome detected distortions, or to adapt the behavior of the receiving modem 103 for resource allocations for decoding transmission frames 150 with low signal-to-noise ratio versus transmission frames 150 with high signal-to-noise ratio.

Referring now to FIGS. 1A, 1B, 6-9 and 10B, another exemplary flowchart of the operation of systems 100A, 100B, 600, 700, 800 and 900 is shown. At block 1006, as described above, the processor 105 determines the time-varying transmission characteristics of a channel of interest 102 based on an embedded bit sequence and at least one embedded side channel field that are included in the transmission frame 150 transmitted by the transmitting modem 101. These time-varying transmission characteristics are used to provide feedback 106 for the transmitting modem 101. At block 1007, as described above, the transmitting modem 101 receives the feedback 106 related to the time-varying transmission characteristics of the channel of interest 102 from the data processor 105. At block 1008, as described above, the transmitting modem 101 adapts the transmission characteristics (e.g. the waveform 251) of a subsequent transmission frame 150 based on the time-varying transmission characteristics of the channel of interest 102.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of a communication platform manufacturing and service method 1100 as shown in FIG. 11 and a communication platform, such as, for example, a satellite 1202 (or other spacecraft) as shown in FIG. 12. In other aspects, the communication platform includes terrestrial, extraterrestrial, aerial and nautical communications platforms. In yet other aspects, the communications platform includes any other suitable communications platform configurations. During pre-production, illustrative method 1100 may include specification and design 1104 of the satellite 1202 and material procurement 1106. During production, component and subassembly manufacturing 1108 and system integration 1110 of the satellite 1102 take place. Thereafter, the satellite 1202 may go through certification and delivery 1112 to be placed in service 1114. While in service by a customer, the satellite 1202 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

As shown in FIG. 12, the satellite 1202 produced by the illustrative method 1100 may include an airframe 1218 with a plurality of high-level systems and an interior 1222. Examples of high-level systems, which are distributed throughout the satellite 1202, include one or more of a propulsion system 1224, an electrical power system 1226, a hydraulic system 1228, and an environmental system 1230 and the satellite communications relay system 1231. The communications relay system 1231 is configured to function as the receiving modem 103. Any number of other systems may be included. Although an aerospace example is shown, the principles of the invention may be applied to other industries, such as the maritime industries.

The system and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the satellite 1202 is in service. Also, one or more aspects of the system, method, or combination thereof may be utilized during the production states 1108 and 1110, for example, by substantially expediting assembly of or reducing the cost of the satellite 1202. Similarly, one or more aspects of the system or method realizations, or a combination thereof, may be utilized, for example and without limitation, while the satellite 1202 is in service, e.g., operation, maintenance and service 1116.

Different examples and aspects of the system and methods are disclosed herein that include a variety of components, features, and functionality. It should be understood that the various examples and aspects of the system and methods disclosed herein may include any of the components, features, and functionality of any of the other examples and aspects of the system and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

In accordance with one or more aspects of the present disclosure, a system for determining communication channel characteristics includes a transmitter comprising a bit sequence generator and a frame processing and modulator unit, where the frame processing and modulator unit is configured to generate a transmission frame comprising an embedded bit sequence generated by the bit sequence generator and at least one embedded side channel field, the transmitter further configured to transmit the transmission frame over a communications channel, a receiver in communication with the transmitter over the communications channel and configured to receive the transmission frame, and a data processor, in communication with the receiver through a data processor interface, configured to receive the transmission frame from the receiver, the processor further configured to process the transmission frame to detect and analyze distortions in a waveform corresponding to the transmission frame generated during the transmission over the communications channel based on the embedded bit sequence and the at least one embedded side channel field.

In accordance with one or more aspects of the present disclosure, the bit sequence generator is configured to generate a pseudorandom sequence.

In accordance with one or more aspects of the present disclosure, the pseudorandom sequence is deterministically generated based on one of the at least one embedded side channel field.

In accordance with one or more aspects of the present disclosure, the bit sequence generator is configured to generate a predetermined bit pattern.

In accordance with one or more aspects of the present disclosure, the at least one embedded side channel field includes one or more of time stamps, environmental data, antenna data, parity data and frame number.

In accordance with one or more aspects of the present disclosure, the data processor is part of the receiver.

In accordance with one or more aspects of the present disclosure, the distortions include one or more of a dropped frame, a bit flip, a multiplexing error, and a header insertion or removal.

In accordance with one or more aspects of the present disclosure, the embedded bit sequence and at least one embedded side channel field are interleaved within the transmission frame.

In accordance with one or more aspects of the present disclosure, the data processor provides feedback to the transmitter regarding the distortions generated during transmission over communications channel.

In accordance with one or more aspects of the present disclosure, the transmitter is configured to adapt the transmission characteristics of the waveform to time varying properties of the communications channel based on the feedback from the data processor.

In accordance with one or more aspects of the present disclosure, the data processor provides feedback to the receiver regarding distortions generated during the transmission over the communications channel, and the receiver is configured to allocate a receiver resource according to the feedback.

In accordance with one or more aspects of the present disclosure, the data processor further configured to process the transmission frame and generate one or more of a channel autocorrelation property, a time series, an error histogram, a stochastic model or a phenomenon correlation.

In accordance with one or more aspects of the present disclosure, the communications channel includes an intermediate node.

In accordance with one or more aspects of the present disclosure, the intermediate node is configured to embed a node bit sequence and a node side channel information into the transmission frame.

In accordance with one or more aspects of the present disclosure, the data processor interface is a low error data transmission interface.

In accordance with one or more aspects of the present disclosure, a method of data communications includes generating a transmission frame, with a frame processing and modulator unit of a transmitter, comprising an embedded bit sequence generated by a bit sequence generator and at least one embedded side channel field, transmitting the transmission frame over a communications channel with the transmitter, receiving the transmission frame with a receiver in communication with the transmitter over the communications channel, receiving the transmission frame with a data processor in communication with the receiver through a data processor interface, and detecting and analyzing distortions of a waveform corresponding to the transmission frame, with the data processor, that are generated during transmission over the communications channel based on the embedded bit sequence and the at least one embedded side channel field.

In accordance with one or more aspects of the present disclosure, the embedded bit sequence is a pseudorandom sequence.

In accordance with one or more aspects of the present disclosure, the embedded bit sequence is a predetermined bit pattern.

In accordance with one or more aspects of the present disclosure, the at least one embedded side channel field includes one or more of time stamps, environmental data, antenna data, parity data and frame numbers.

In accordance with one or more aspects of the present disclosure, the distortions include one or more of a dropped frame, a bit flip, a multiplexing error, and a header insertion or removal.

In accordance with one or more aspects of the present disclosure, the embedded bit sequence and at least one embedded side channel field are interleaved.

In accordance with one or more aspects of the present disclosure, the method further including providing feedback, with the data processor, to the transmitter regarding the distortions generated during transmission over communications channel.

In accordance with one or more aspects of the present disclosure, the method further including adapting the transmission characteristics of the waveform, with the transmitter, to time varying properties of the communications channel based on the feedback from the data processor.

In accordance with one or more aspects of the present disclosure, further comprising providing, with the data processor, feedback to the receiver regarding distortions generated during the transmission over the communications channel, and the receiver is configured to allocate a receiver resource according to the feedback.

In accordance with one or more aspects of the present disclosure, further comprising generating, with the data processor, one or more of a channel autocorrelation property, a time series, an error histogram, a stochastic model or a phenomenon correlation.

In accordance with one or more aspects of the present disclosure, the communications channel includes an intermediate node.

In accordance with one or more aspects of the present disclosure, the intermediate node is configured to embed a node bit sequence and a node side channel information into the transmission frame.

In accordance with one or more aspects of the present disclosure, a method of data communication includes determining and analyzing, with a data processor of a receiving modem, time varying transmission characteristics of a communication channel based on an embedded bit sequence and at least one embedded side channel field that are included in a transmission frame, transmitted by a transmitter, receiving, with the transmitter, feedback related to the time varying transmission characteristics of the communications channel, and with the transmitter, adapting the transmission characteristics of a subsequent transmission frame based on the time varying transmission characteristics of the communications channel.

In accordance with one or more aspects of the present disclosure, the embedded bit sequence is a pseudorandom sequence.

In accordance with one or more aspects of the present disclosure, the embedded bit sequence is a predetermined bit pattern.

In accordance with one or more aspects of the present disclosure, the at least one embedded side channel field includes one or more of time stamps, environmental data, antenna data and parity data.

In accordance with one or more aspects of the present disclosure, the embedded bit sequence and at least one embedded side channel field are interleaved.

In accordance with one or more aspects of the present disclosure, the data processor provides feedback to the receiver regarding distortions generated during the transmission over the communications channel, and the receiver is configured to allocate a receiver resource according to the feedback.

In accordance with one or more aspects of the present disclosure, the data processor further configured to process the transmission frame and generate one or more of a channel autocorrelation property, a time series, an error histogram, a stochastic model or a phenomenon correlation.

In accordance with one or more aspects of the present disclosure, the communications channel includes an intermediate node.

In accordance with one or more aspects of the present disclosure, the intermediate node is configured to embed a node bit sequence and a node side channel information into the transmission frame.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A system for determining communication channel characteristics comprising:
a transmitter comprising a bit sequence generator and a frame processing and modulator unit, where the frame processing and modulator unit is configured to generate a transmission frame comprising an embedded bit sequence generated by the bit sequence generator and at least one embedded side channel field, the transmitter further configured to transmit the transmission frame over a communications channel;
a receiver in communication with the transmitter over the communications channel and configured to receive the transmission frame; and
a data processor, in communication with the receiver and the transmitter through a data processor interface, the data processor being configured to receive the transmission frame from the receiver, the data processor further configured to process the transmission frame to detect and analyze distortions in a waveform corresponding to the transmission frame generated during the transmission over the communications channel based on the embedded bit sequence and the at least one embedded side channel field;
wherein the data processor provides feedback to at least one of the receiver and the transmitter regarding distortions generated during the transmission over the communications channel, and the receiver is configured to allocate a receiver resource according to the feedback.

2. The system of claim 1, wherein the bit sequence generator is configured to generate a pseudorandom sequence.

3. The system of claim 1, wherein the bit sequence generator is configured to generate a predetermined bit pattern.

4. The system of claim 1, wherein the at least one embedded side channel field includes one or more of time stamps, environmental data, antenna data, parity data and frame number.

5. The system of claim 1, wherein the distortions include one or more of a dropped frame, a bit flip, a multiplexing error, and a header insertion or removal.

6. The system of claim 1, wherein the embedded bit sequence and at least one embedded side channel field are interleaved within the transmission frame.

7. The system of claim 1, wherein the transmitter adapts the transmission characteristics of the waveform to time varying properties of the communications channel based on the feedback from the data processor.

8. The system of claim 1, wherein the data processor further configured to process the transmission frame and generate one or more of a channel autocorrelation property, a time series, an error histogram, a stochastic model or a phenomenon correlation.

9. The system of claim 1, wherein the communications channel includes an intermediate node.

10. The system of claim 9, wherein the intermediate node is configured to embed a node bit sequence and a node side channel information into the transmission frame.

11. A method of data communication comprising:
determining and analyzing, with a data processor of a receiving modem, time varying transmission characteristics of a communication channel based on an embedded bit sequence and at least one embedded side channel field that are included in a transmission frame, transmitted by a transmitter,
receiving, with the transmitter, feedback related to the time varying transmission characteristics of the communications channel, and
with the transmitter, adapting the transmission characteristics of a subsequent transmission frame based on the time varying transmission characteristics of the communications channel.

12. The method of claim 11, wherein the embedded bit sequence is a pseudorandom sequence.

13. The method of claim 11, wherein the embedded bit sequence is a predetermined bit pattern.

14. The method of claim 11, wherein the at least one embedded side channel field includes one or more of time stamps, environmental data, antenna data and parity data.

15. The method of claim 11, wherein the embedded bit sequence and at least one embedded side channel field are interleaved.

16. The method of claim 11, wherein the data processor provides feedback to the receiver regarding distortions generated during the transmission over the communications channel, and the receiver is configured to allocate a receiver resource according to the feedback.

17. The method of claim 11, wherein the data processor processes the transmission frame and generates one or more of a channel autocorrelation property, a time series, an error histogram, a stochastic model or a phenomenon correlation.

18. The method of claim 11, wherein the communications channel includes an intermediate node.

19. The method of claim 18, wherein the intermediate node is configured to embed a node bit sequence and a node side channel information into the transmission frame.

* * * * *